US009795913B1

(12) United States Patent
Flora et al.

(10) Patent No.: US 9,795,913 B1
(45) Date of Patent: Oct. 24, 2017

(54) SYSTEM FOR REMOVING PARTICLES FROM AN AIR STREAM

(71) Applicants: Jonathan J Flora, Modesto, CA (US); Douglas W Flora, Modesto, CA (US); Adam Benedict, Modesto, CA (US)

(72) Inventors: Jonathan J Flora, Modesto, CA (US); Douglas W Flora, Modesto, CA (US); Adam Benedict, Modesto, CA (US)

(73) Assignee: EXACT CORPORATION, Modesto, CA (US)

( * ) Notice: Subject to any disclaimer, the term of this patent is extended or adjusted under 35 U.S.C. 154(b) by 0 days.

(21) Appl. No.: 13/692,247

(22) Filed: Dec. 3, 2012

Related U.S. Application Data

(63) Continuation-in-part of application No. 13/288,889, filed on Nov. 3, 2011, now Pat. No. 8,347,595, which is a continuation of application No. 12/625,481, filed on Dec. 29, 2009, now Pat. No. 8,056,313.

(60) Provisional application No. 61/220,893, filed on Jun. 26, 2009, provisional application No. 61/238,067, filed on Aug. 28, 2009, provisional application No. 61/278,522, filed on Oct. 6, 2009.

(51) Int. Cl.
*E01H 1/08* (2006.01)
*B01D 47/06* (2006.01)
*A01D 75/00* (2006.01)

(52) U.S. Cl.
CPC ............. *B01D 47/06* (2013.01); *A01D 75/00* (2013.01)

(58) Field of Classification Search
CPC ...... A01D 46/24; A01D 51/002; A01D 51/00; A01D 25/046; A01D 25/048; A01D 25/044; A01D 33/08; E01C 2301/50; E01H 1/106; B01D 47/14; B01D 47/06
USPC .................... 56/328.1; 137/236.1, 386; 47/2; 96/297, 300, 356, 277; 15/84, 304.3, 15/340.4, 340.3; 210/710; 209/147, 209/139.1, 470, 139.2, 170
See application file for complete search history.

(56) References Cited

U.S. PATENT DOCUMENTS

| | | | | |
|---|---|---|---|---|
| 2,027,906 | A | * | 1/1936 | Hand ............................... 55/477 |
| 2,496,281 | A | * | 2/1950 | Fisher ................... F23J 15/027 261/126 |
| 2,604,068 | A | * | 7/1952 | Dolbey ................... E04F 21/12 118/308 |

(Continued)

FOREIGN PATENT DOCUMENTS

| | | | | |
|---|---|---|---|---|
| CN | 201664563 U | * | 12/2010 | ............. B01D 47/14 |
| GB | 2382042 A | * | 5/2003 | ......... B01D 46/0002 |

(Continued)

*Primary Examiner* — Arpád Fábián-Kovács
(74) *Attorney, Agent, or Firm* — R. Scott Kimsey, Esq.; Klein DeNatale Goldner

(57) ABSTRACT

A system for removing particles from an air stream includes a housing having an air stream inlet at a first end, and an air stream outlet at a second end. The housing defines a flow path between the air stream inlet and air stream outlet. An agricultural device generating an air stream containing particles is in fluid communication with the housing, the air stream from the agricultural device being directed into the air stream inlet of the housing. An aggregator is disposed between the air stream inlet and the air stream outlet. The aggregator facilitates the aggregation of particles within the air stream. The aggregated particles fall from the aggregator by force of gravity.

6 Claims, 26 Drawing Sheets

(56) References Cited

U.S. PATENT DOCUMENTS

| | | | | |
|---|---|---|---|---|
| 2,664,580 A | * | 1/1954 | Feeser | 15/3.2 |
| 2,721,656 A | * | 10/1955 | Goodwin | A01D 46/00 209/308 |
| 2,932,360 A | * | 4/1960 | Hungate | 96/282 |
| 3,626,677 A | * | 12/1971 | Sides | 56/328.1 |
| 3,630,355 A | * | 12/1971 | Christensen | A01D 51/002 209/137 |
| 3,681,169 A | * | 8/1972 | Wiquel | C03B 37/03 156/62.2 |
| 3,778,982 A | * | 12/1973 | Birke | B01D 46/0073 55/290 |
| 3,800,513 A | * | 4/1974 | Lappin | B01D 47/06 261/79.2 |
| 3,802,162 A | * | 4/1974 | Deane | 96/282 |
| 3,869,266 A | * | 3/1975 | Rannenberg | B01D 45/12 55/309 |
| 3,918,940 A | * | 11/1975 | Westlake | B01D 47/10 261/116 |
| 3,989,485 A | * | 11/1976 | Kilian | B01D 50/00 261/79.2 |
| 4,068,802 A | | 1/1978 | Goings | |
| 4,157,249 A | * | 6/1979 | Namy | 96/282 |
| 4,289,509 A | | 9/1981 | Holter | |
| 4,361,477 A | | 11/1982 | Miller | |
| 4,364,222 A | | 12/1982 | Ramacher | |
| 4,378,976 A | * | 4/1983 | Rush | B01D 46/005 422/186 |
| 4,810,268 A | * | 3/1989 | Chambers | B01D 47/06 261/116 |
| 4,846,856 A | * | 7/1989 | Burger et al. | 96/19 |
| 4,877,431 A | * | 10/1989 | Avondoglio | B01D 45/04 55/321 |
| 4,997,549 A | * | 3/1991 | Atwood | B03D 1/1425 209/164 |
| 5,178,654 A | | 1/1993 | Cowlet et al. | |
| 5,219,208 A | | 6/1993 | Liao et al. | |
| 5,253,925 A | | 10/1993 | Modzik, Jr. | |
| 5,361,600 A | | 11/1994 | Kelley | |
| 5,415,671 A | | 5/1995 | Bouchard et al. | |
| 5,421,147 A | | 6/1995 | Holden et al. | |
| 5,683,476 A | * | 11/1997 | Divers | B01D 50/004 261/112.1 |
| 5,713,970 A | | 2/1998 | Raring | |
| 5,743,043 A | | 4/1998 | Habenicht et al. | |
| 5,803,955 A | | 9/1998 | Raring | |
| 6,036,600 A | | 3/2000 | Kruckman | |
| 6,277,176 B1 | * | 8/2001 | Tang et al. | 95/270 |
| 6,312,504 B1 | * | 11/2001 | Both | B01D 45/08 55/385.5 |
| 6,348,086 B1 | * | 2/2002 | Harms et al. | 96/125 |
| 6,478,859 B1 | | 11/2002 | Ferlin et al. | |
| 6,752,857 B1 | * | 6/2004 | Birdwell | B01D 45/14 55/406 |
| 6,767,007 B2 | * | 7/2004 | Luman | B01F 3/0446 261/76 |
| 6,979,261 B1 | | 12/2005 | Day et al. | |
| 7,131,254 B2 | | 11/2006 | Flora et al. | |
| 7,135,058 B1 | * | 11/2006 | Burkay | B01D 47/04 261/118 |
| 7,409,743 B2 | | 8/2008 | Di Anna | |
| 7,412,817 B2 | | 8/2008 | Flora et al. | |
| 7,500,542 B2 | | 3/2009 | Merant et al. | |
| 7,833,303 B1 | * | 11/2010 | Higgins | 55/400 |
| 8,347,595 B1 | * | 1/2013 | Flora et al. | 56/328.1 |
| 2004/0003578 A1 | * | 1/2004 | Twiefel | 55/289 |
| 2004/0020003 A1 | * | 2/2004 | Strauser | 15/340.3 |
| 2005/0076782 A1 | * | 4/2005 | Weinbren | 96/306 |
| 2005/0126396 A1 | * | 6/2005 | Park | 96/313 |
| 2006/0032954 A1 | * | 2/2006 | Lee et al. | 241/74 |
| 2006/0150592 A1 | * | 7/2006 | Iizuka | 55/400 |
| 2006/0236497 A1 | * | 10/2006 | Riach | 15/340.1 |
| 2006/0283157 A1 | * | 12/2006 | Keys et al. | 55/290 |
| 2007/0125558 A1 | | 6/2007 | Embry | |
| 2007/0231885 A1 | * | 10/2007 | Choate | B01D 53/1487 435/290.3 |
| 2008/0047239 A1 | * | 2/2008 | Zheng et al. | 55/337 |
| 2008/0061004 A1 | * | 3/2008 | Balvanz | A23K 1/06 210/710 |
| 2012/0073445 A1 | * | 3/2012 | Plush | 96/322 |

FOREIGN PATENT DOCUMENTS

| | | | | |
|---|---|---|---|---|
| KR | 2006072017 A | * | 6/2006 | B01D 47/06 |
| SU | 421380 A | * | 8/1974 | B07B 1/20 |
| WO | WO 2006066333 A1 | * | 6/2006 | B01D 46/0079 |
| WO | WO 2006092702 | | 9/2006 | |

\* cited by examiner

US 9,795,913 B1

SYSTEM FOR REMOVING PARTICLES FROM AN AIR STREAM

RELATED APPLICATIONS

The present Application is a continuation in part of U.S. patent application Ser. No. 13/288,889, filed Nov. 3, 2011, and entitled "Dust Suppression System;" U.S. patent application Ser. No. 13/288,889 is a continuation of U.S. patent application Ser. No. 12/625,481, entitled "Mobile Machinery Having a Dust Suppression System," and filed Dec. 29, 2009; U.S. patent application Ser. No. 13/242,588, entitled "Mobile Machinery Having a Dust Suppression System," and filed Sep. 23, 2011 is a division of U.S. patent application Ser. No. 12/625,481; U.S. patent application Ser. No. 12/625,481 is a non-provisional of U.S. Provisional Patent Application No. 61/220,893, filed on Jun. 26, 2009, U.S. Provisional Patent Application No. 61/238,067, filed on Aug. 28, 2009, and U.S. Provisional Patent Application No. 61/278,522, filed on Oct. 6, 2009. These Applications are incorporated by reference herein in their entirety.

BACKGROUND OF THE INVENTION

1. Field of the Invention

The present invention relates generally to a system for controlling dust and other particulates, and more particularly to a system for removing dust and other particulate matter from an air stream.

2. Background

Dust generation by agricultural and construction machinery is a known problem, particularly in arid areas. To name just a few problems caused by the dust generation, dust particles result in air pollution, water pollution, soil loss, human and animal health problems, and potentially hazardous reductions in visibility. In addition, the dust can adversely impact the health of various plants. In an effort to reduce dust production, some air pollution control districts impose various operating limitations on farm machinery or otherwise impose different dust control measures.

Dust generation from nut and fruit harvesting equipment can be particularly problematic. These devices typically utilize high volume fans to separate nuts and/or fruit from the debris which may be picked up by the harvesting equipment, including leaves, branches, dirt clods, soil, etc. (collectively, "foreign material"). However, a large portion of the foreign material is typically blown out through the fan discharge, resulting in the dispersion of a large volume of dust into the atmosphere. An example of such a harvester is disclosed in U.S. Pat. No. 4,364,222, which is incorporated herein by this reference. In these devices, a mixture of fruit or nuts (generally referred to as "crops") and foreign material is picked up and deposited on conveyors enclosed by a housing connected to a fan inducing a vigorous flow of air through the conveyors. Various baffles, walls and guide plates direct the air so as to enhance the separation of the desirable crops from the foreign material. However, a substantial volume of foreign material is typically discharged into the atmosphere with a minimum amount of processing, thus creating a large discharge of dust.

In addition to the agricultural settings described above, dust and other particulates may be present in an air stream under a variety of circumstances. Regardless of the cause of the introduction of such particulates into the air, the hazards and disadvantages above remain present. A number of devices have been developed to remove dust and other fine particles from an air stream. Electrostatic filters, for example, use an electrical field and rely on the action of electrostatic forces to remove particles from an air stream. Such filtration devices can suffer from a non-homogeneous flow of air in proximity to the electrostatic plates and may also fail to function as well when humidity is high. Mechanical filters are also known, and while these are often effective they can result in significant head loss and are also prone to becoming clogged by particles being filtered from the air stream.

International Publication No. WO 2006/092702 A2, entitled "Cleaner for Air Polluted by Fine Dusts and Relative Purifying Process," by Cirillo et al., described a system for removing fine dust particles from an air stream. In that device, a stream of air impacts a rotating brush and the fine particles in the air adhere to the brush. The rotational speed of the brush is such that the fine particles migrate to the tips of the brush through centrifugal force and are then cast off of the brush into the housing of the device. Although Cirillo et al. provide a perforated wall through which the particles preferably pass, the rapid rotation of the brushes of Cirillo et al. necessarily result in a more or less uniform distribution of cast off particles within the device, rather than deposited the particles in a more precise location. Further, enough energy must be provided to the device of Cirillo et al. to maintain sufficient rotational speeds of the brush to allow the centrifugal forces to act as suggested by that disclosure.

What is needed, then, is a device and system that can be used in a variety of circumstances, and under a variety of conditions, to remove dust and other particulate matter from the air.

SUMMARY OF THE INVENTION

The present invention provides a system for removing particles from an air stream. The system includes a housing having an air stream inlet at a first end, and an air stream outlet at a second end. The housing defines a flow path between the air stream inlet and air stream outlet. An agricultural device generating an air stream containing particles is in fluid communication with the housing, the air stream from the agricultural device being directed into the air stream inlet of the housing. An aggregator is disposed between the air stream inlet and the air stream outlet. The aggregator facilitates the aggregation of particles within the air stream. The aggregated particles fall from the aggregator by force of gravity.

In some embodiments of the invention, the aggregator may be a scrubber, a cyclone separator, an air stream mixer, or combinations of these.

In some embodiments of the invention where the aggregator is a scrubber, the aggregator may be a chain accumulator, a rotating drum, a rotating membrane, a paddle wheel, or combinations of these.

Some embodiments of the invention may further include a cleaning spray nozzle disposed within the housing. The cleaning spray nozzle directs liquid onto the surface of the scrubber to wet it.

In some embodiments of the invention, the housing has at least one liquid introduction jet disposed within the housing between the air stream inlet and the aggregator. The liquid introduction jet moistens or wets the particles in the air stream before they enter the aggregator.

DETAILED DESCRIPTION OF THE INVENTION

Figure 1:
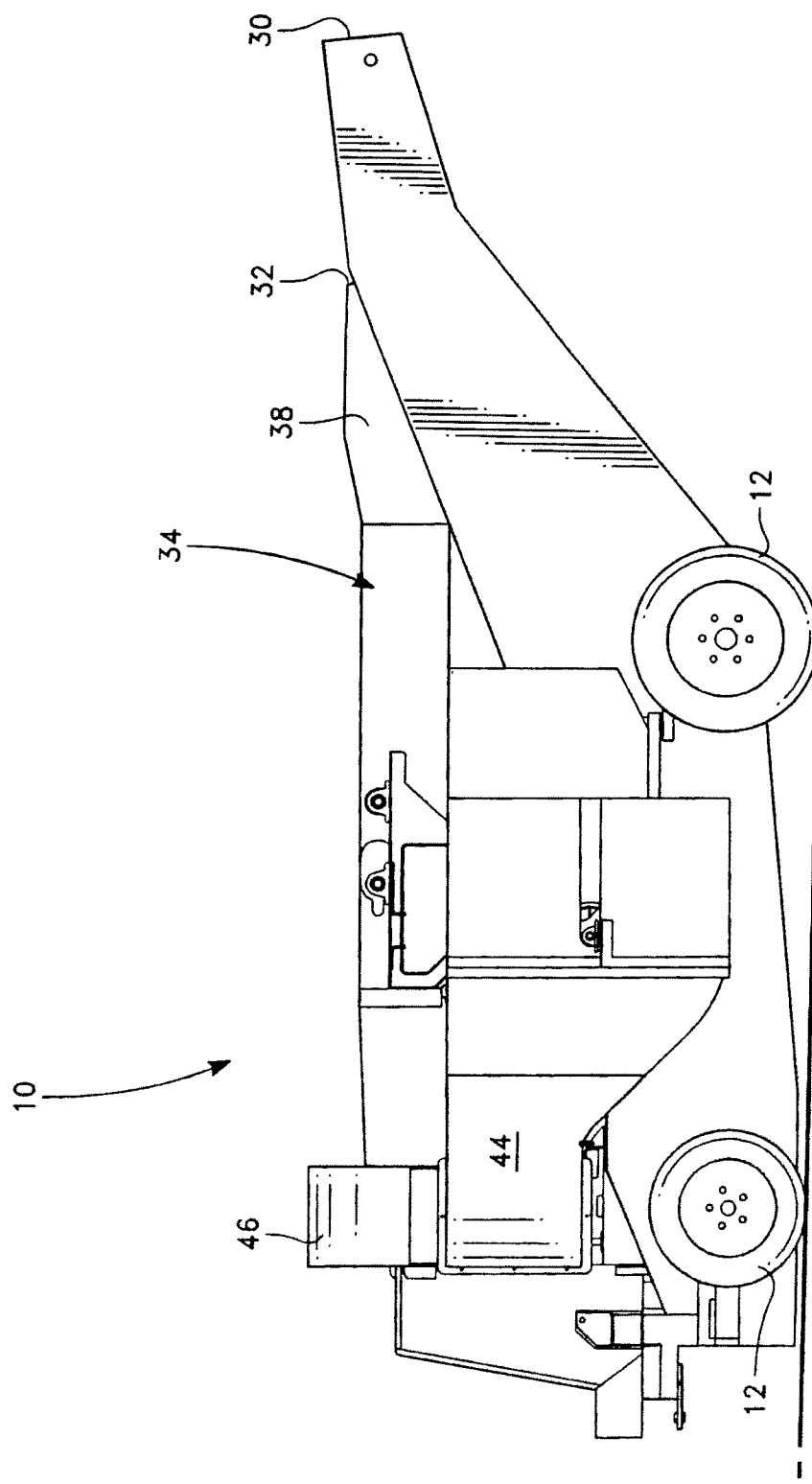
FIG. 1 is a left hand view of a harvester comprising an embodiment of the disclosed dust suppression system.
Figure 2:
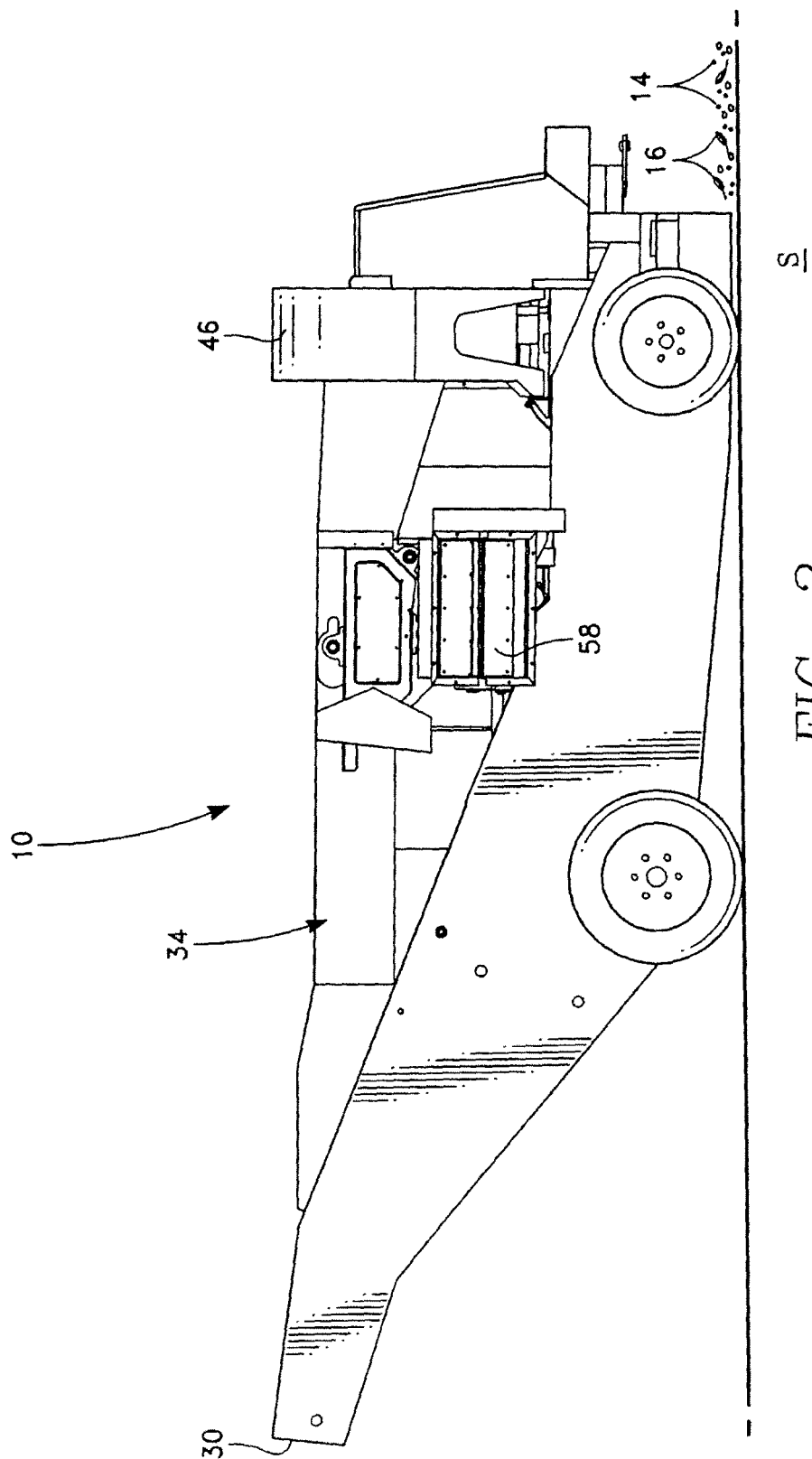
FIG. 2 is a right hand view of a harvester comprising an embodiment of the disclosed dust suppression system.
Figure 3:
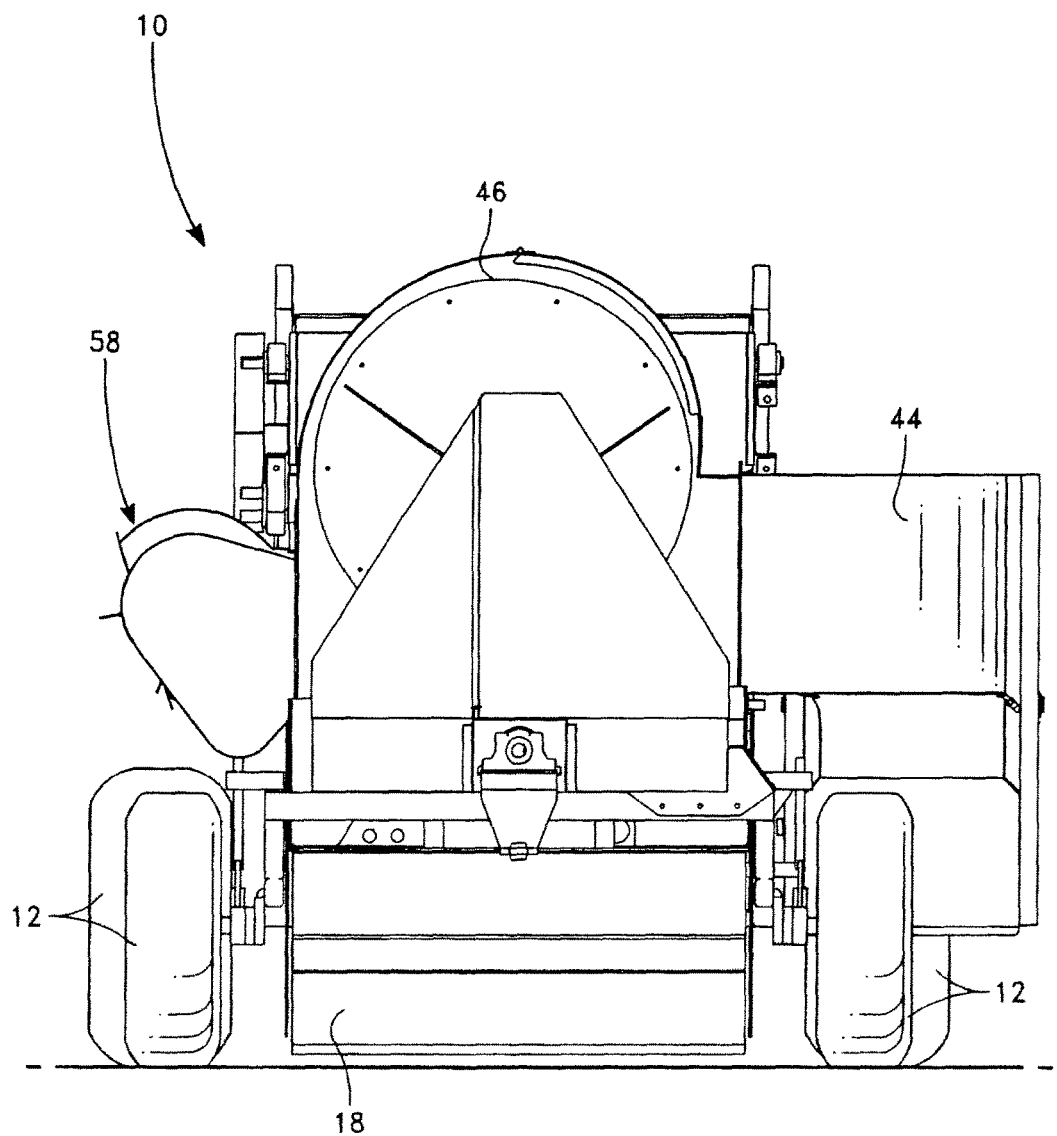
FIG. 3 is a front view of a harvester comprising an embodiment of the disclosed dust suppression system.
Figure 4:
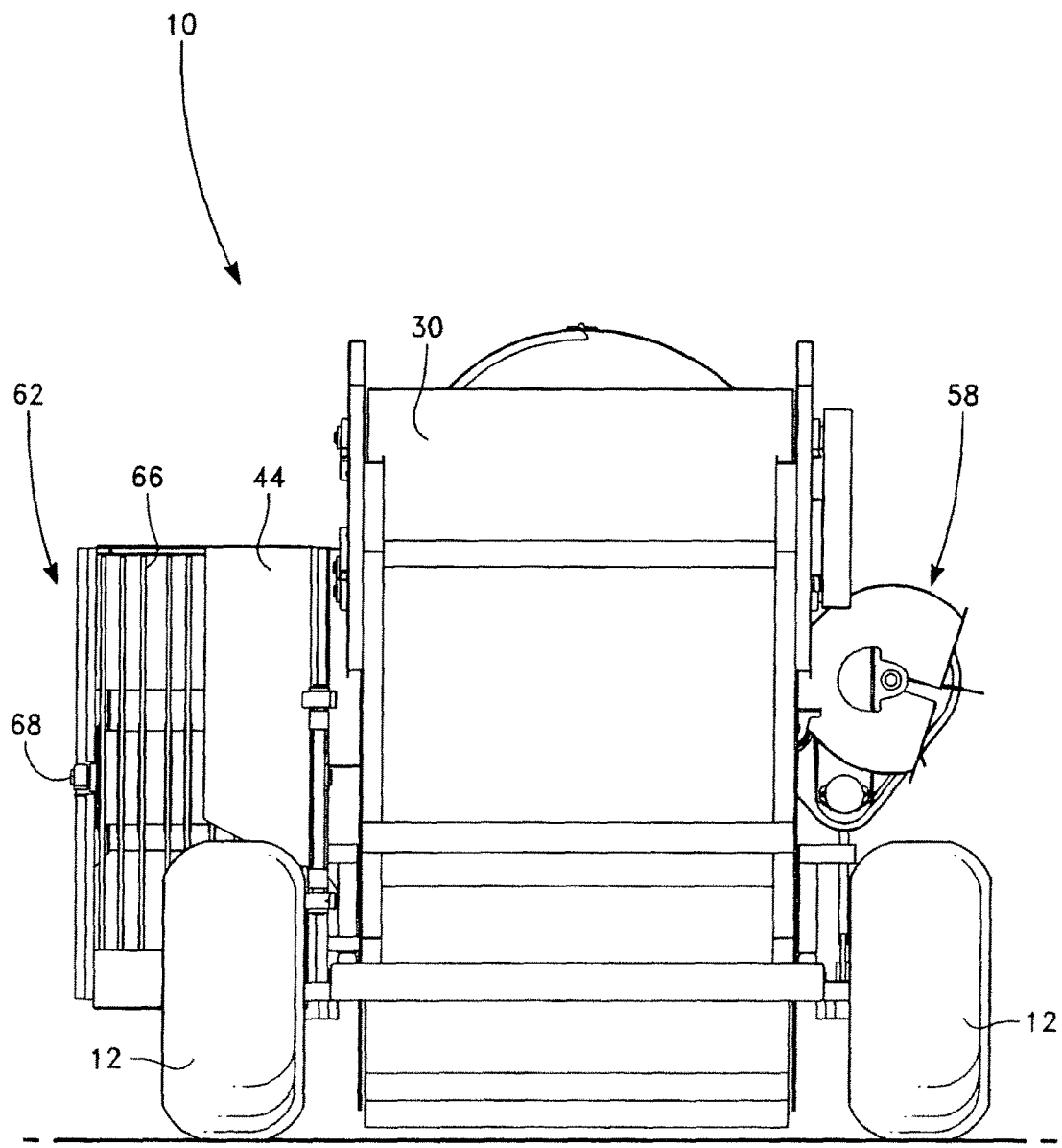
FIG. 4 is a rear view of a harvester comprising an embodiment of the disclosed dust suppression system.
Figure 5:
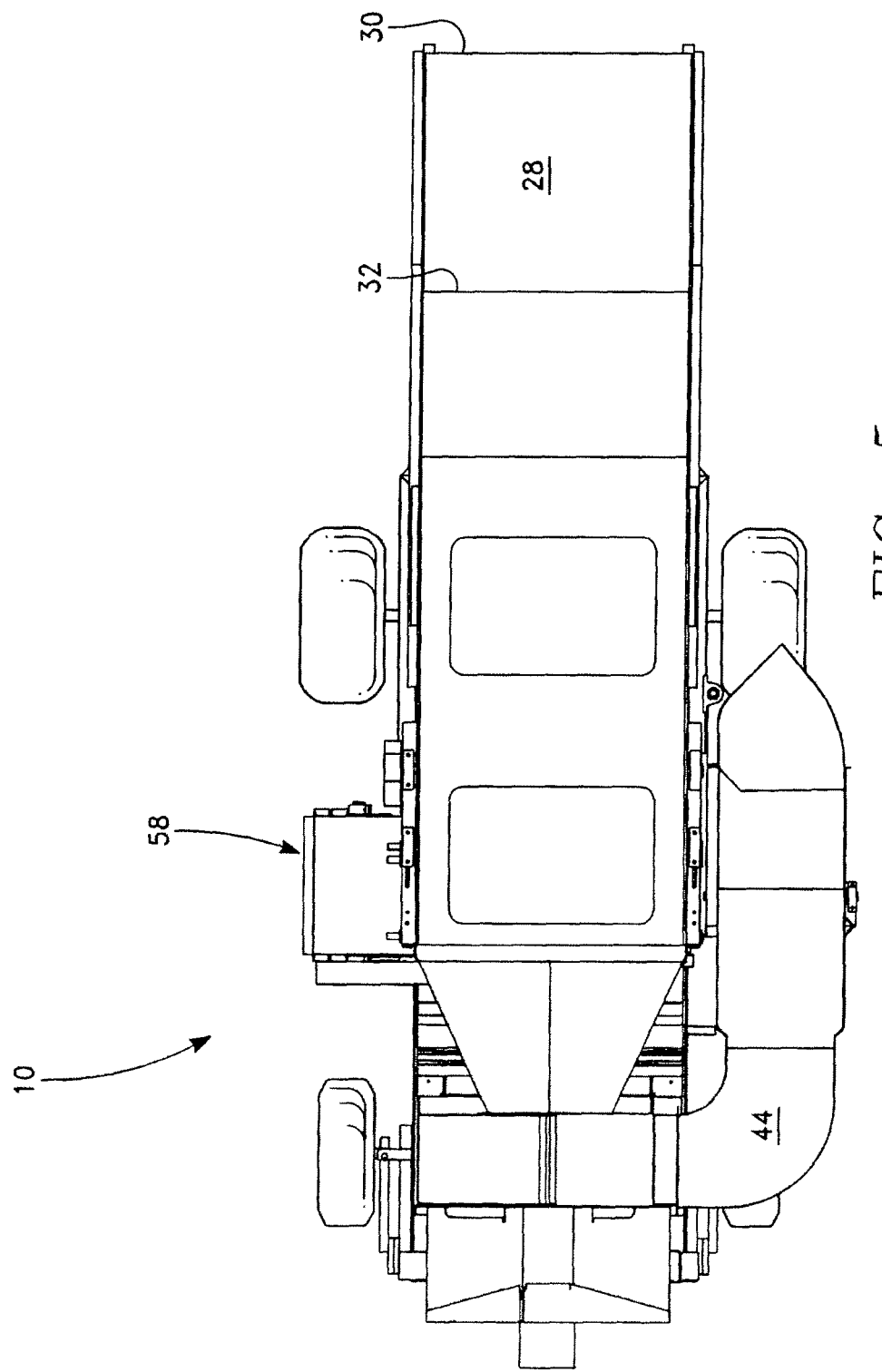
FIG. 5 is a top view of a harvester comprising an embodiment of the disclosed dust suppression system.
Figure 6:
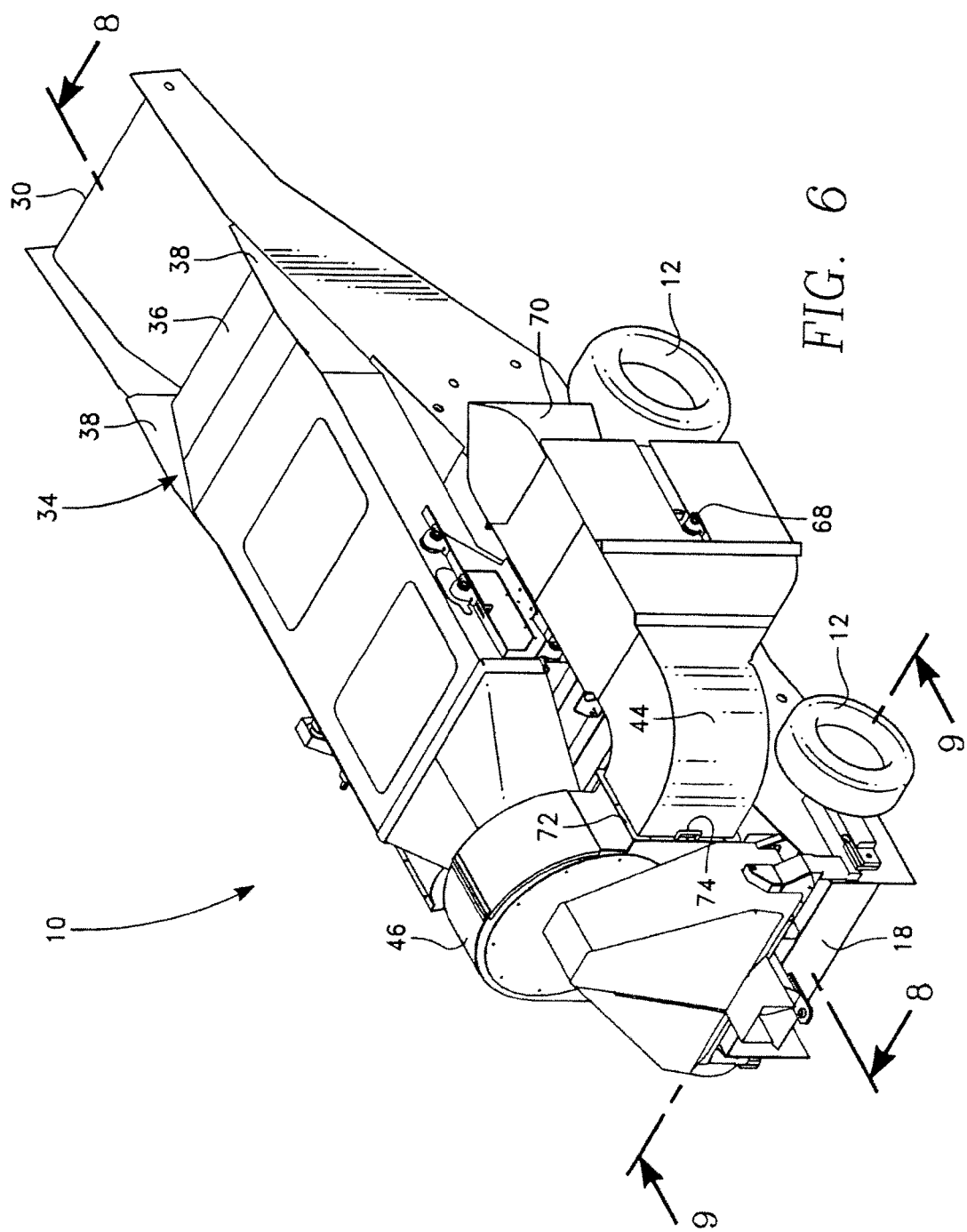
FIG. 6 is an isometric view of the left hand side of a harvester comprising an embodiment of the disclosed dust suppression system.
Figure 7:
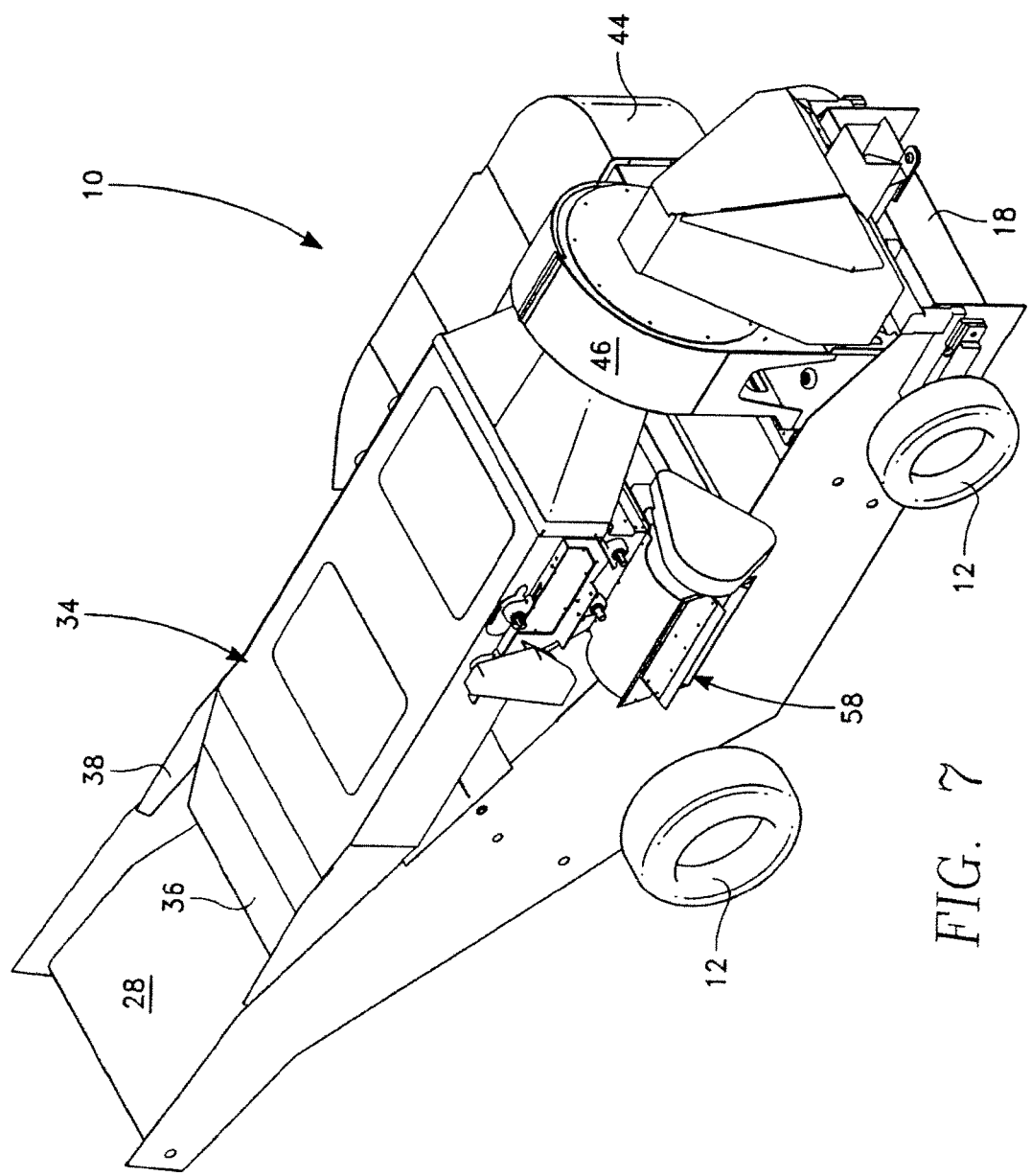
FIG. 7 is an isometric view of the right hand side of a harvester comprising an embodiment of the disclosed dust suppression system.
Figure 8:
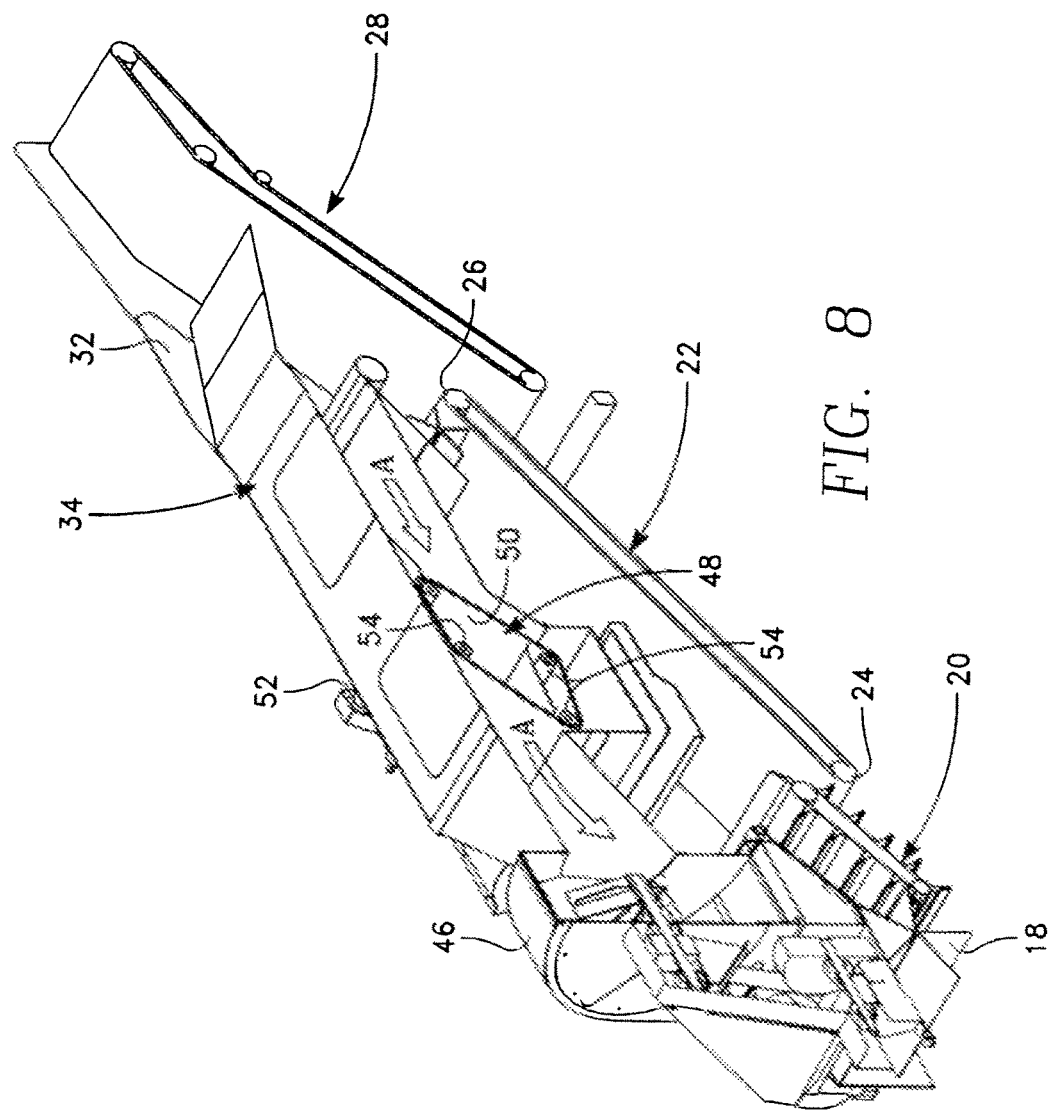
FIG. 8 is a sectional view of a harvester along line 8-8 of FIG. 6.
Figure 9:
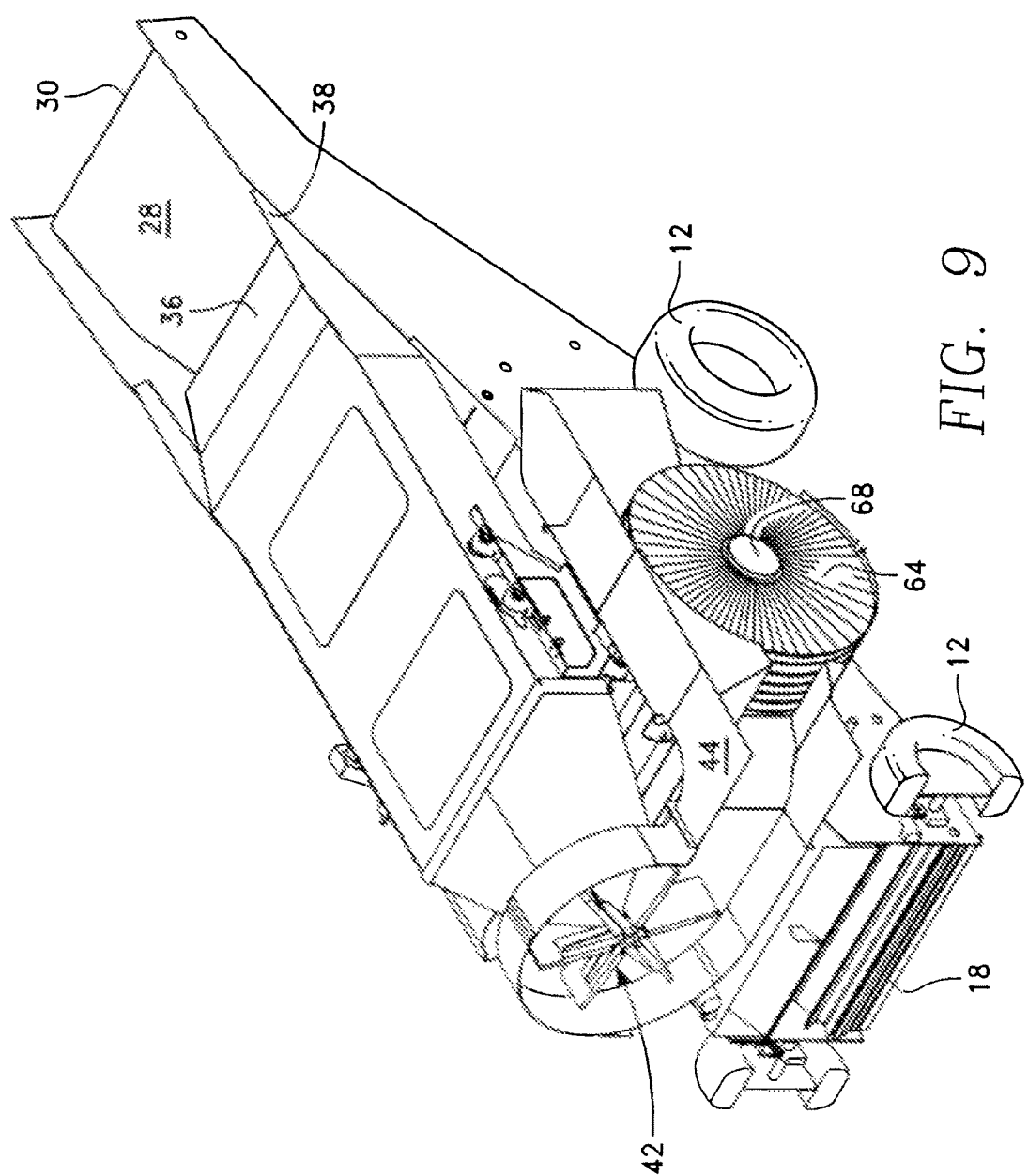
FIG. 9 is a sectional view of a harvester along line 9-9 of FIG. 6, with a portion of the housing removed to show the fan rotor and drum brush.
Figure 10:
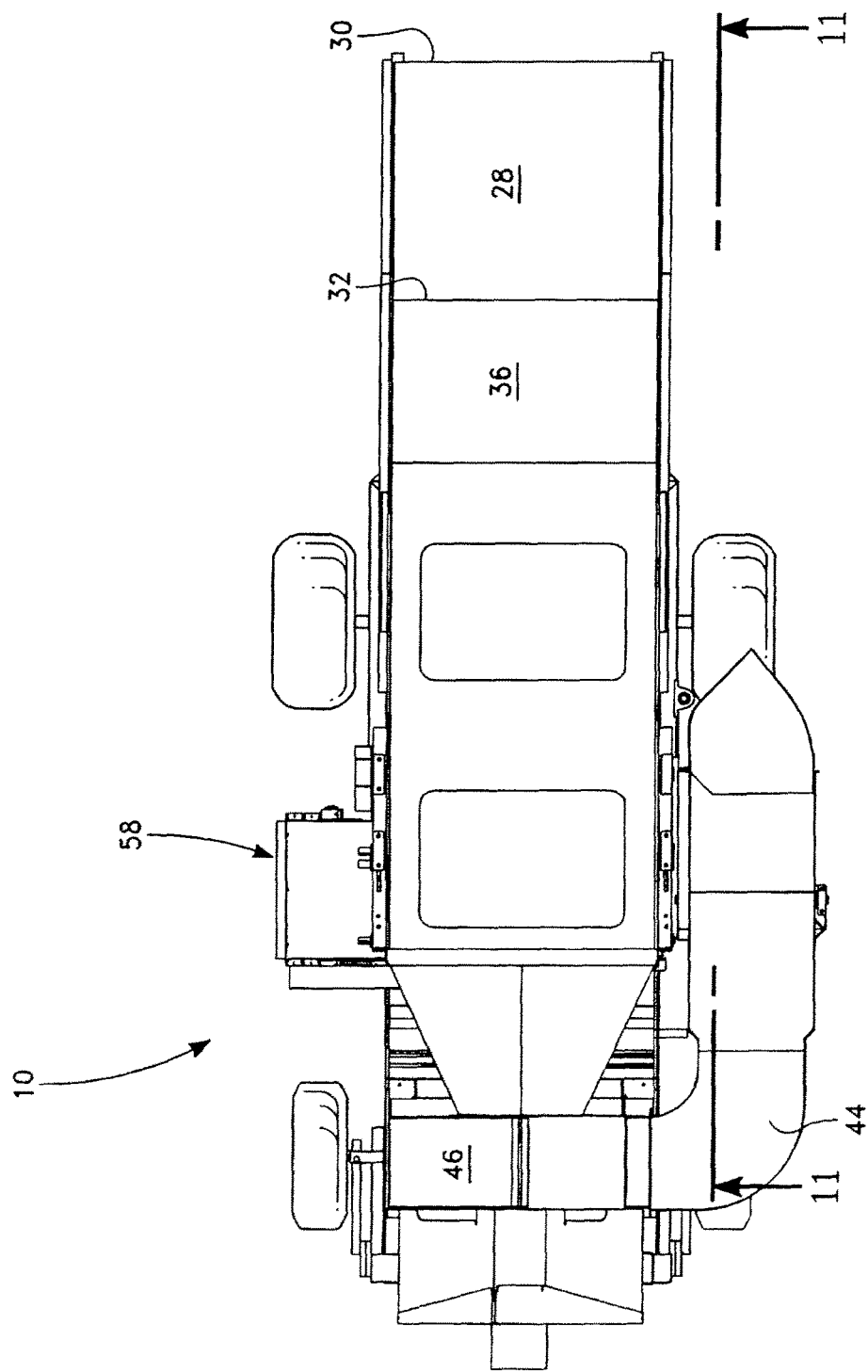
FIG. 10 is a top view of an embodiment of the harvester.
Figure 11:
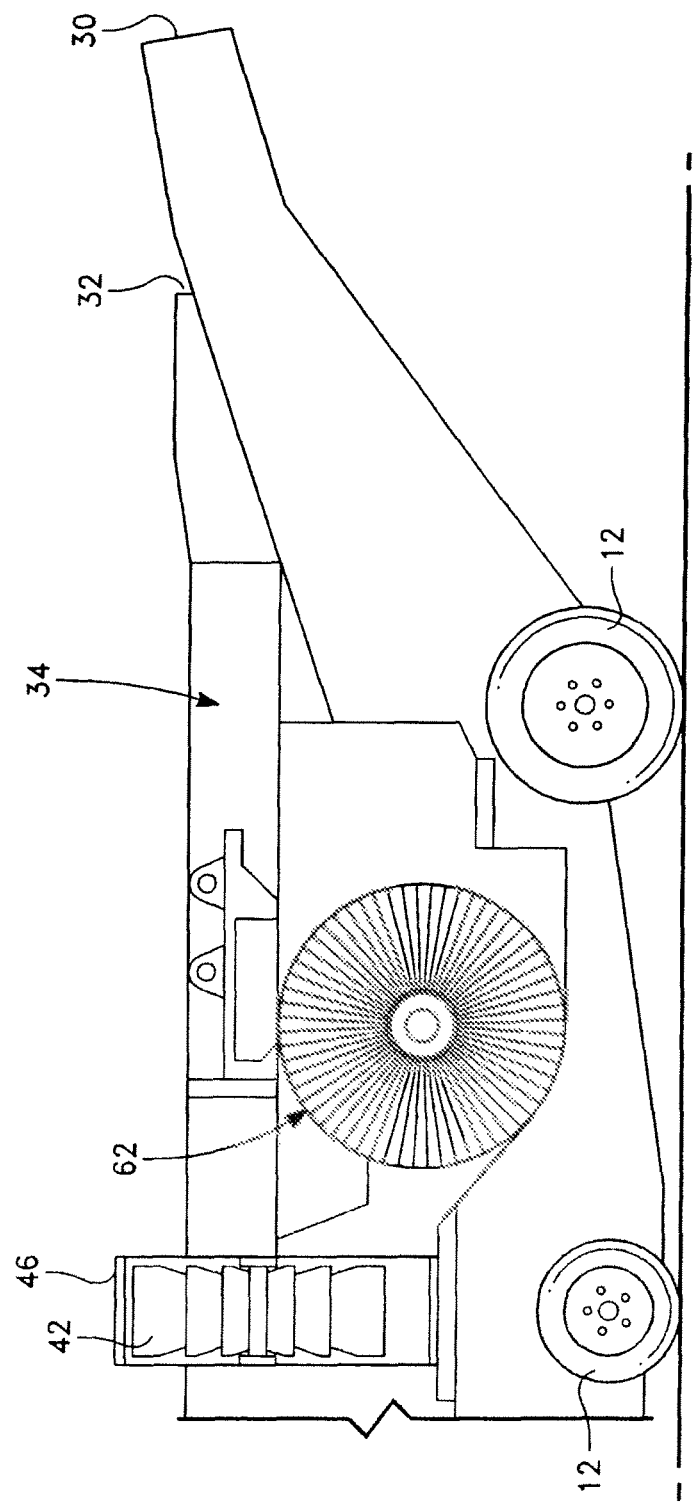
FIG. 11 is a sectional view taken along line 11-11 of FIG. 10.
Figure 12:
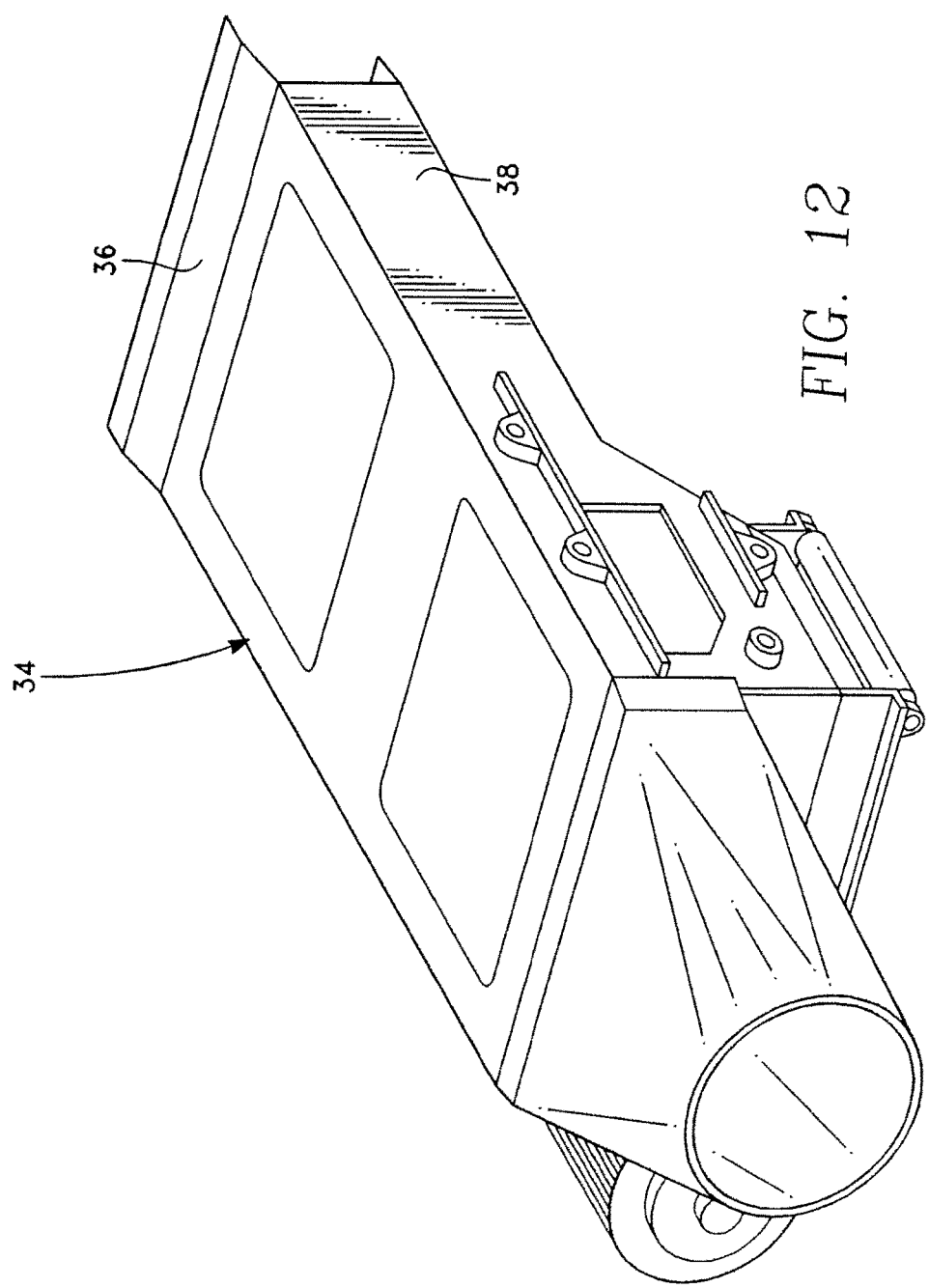
FIG. 12 is a partial isometric showing a portion of the upper housing for an embodiment of the disclosed dust suppression system.
Figure 13:
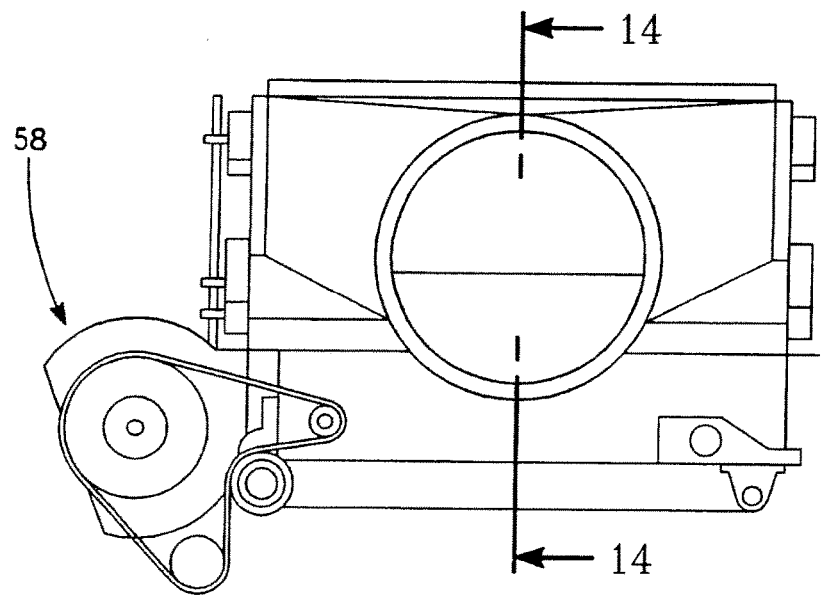
FIG. 13 shows a partial front view of the housing for an embodiment of the harvester.
Figure 14:
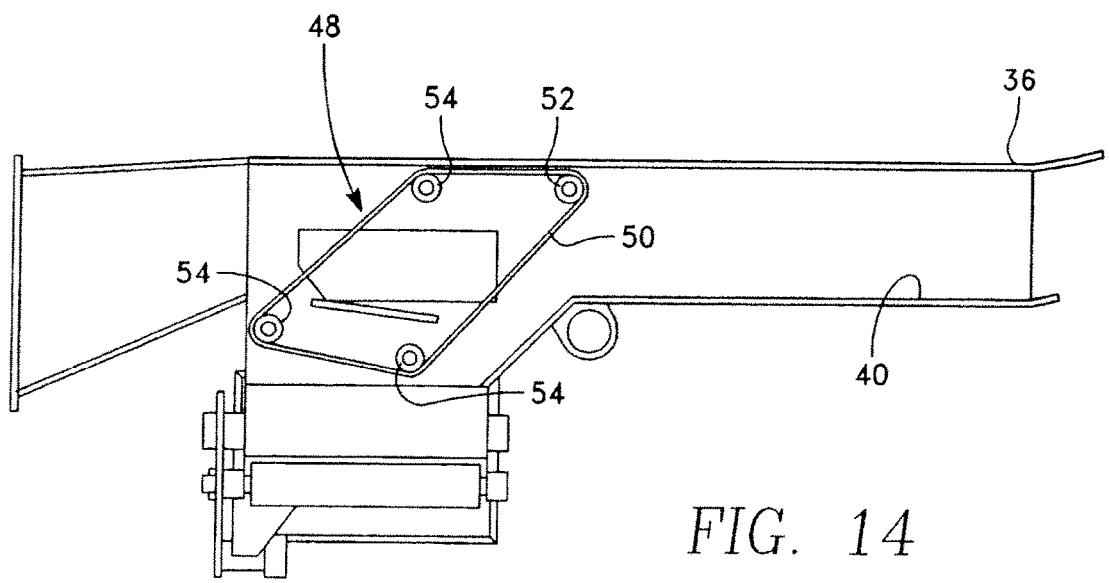
FIG. 14 is a sectional view taken along line 14-14 of FIG. 13.
Figure 15:
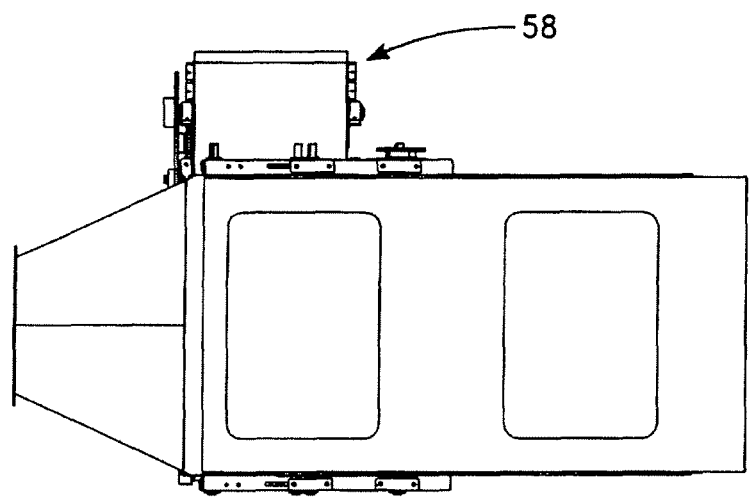
FIG. 15 is a partial top view of the housing for an embodiment of the harvester.
Figure 16:
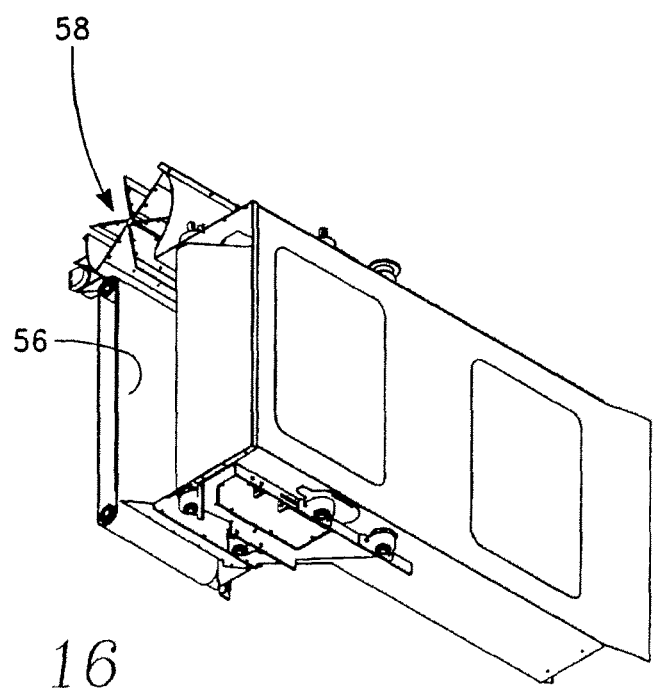
FIG. 16 is a partial isometric view of the housing for an embodiment of the harvester.
Figure 17:
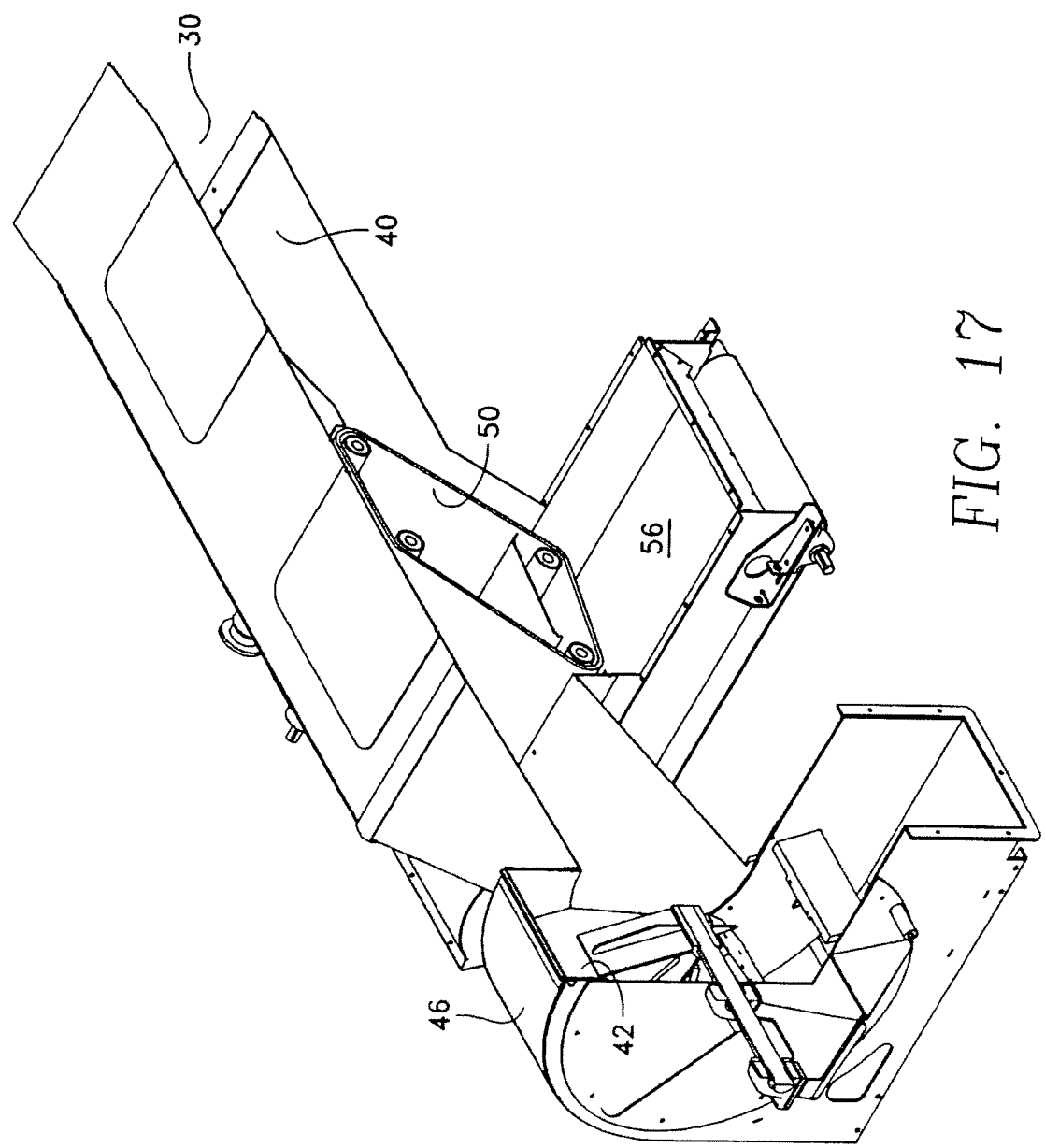
FIG. 17 is a partial sectional view showing, among other things, the relative positions of the air stream cleaning chain and the cross conveyor discharge belt which may be utilized in an embodiment of the disclosed harvester.
Figure 18:
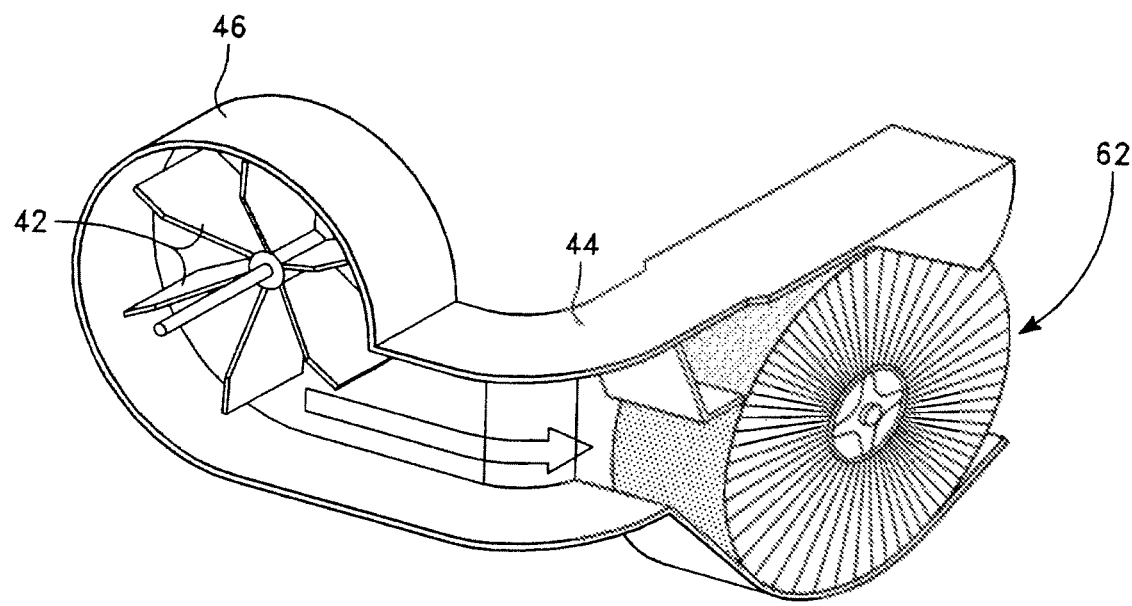
FIG. 18 shows a partial isometric view of a fan-brush combination which may be utilized in an embodiment of the disclosed harvester, showing the flow direction.
Figure 19:
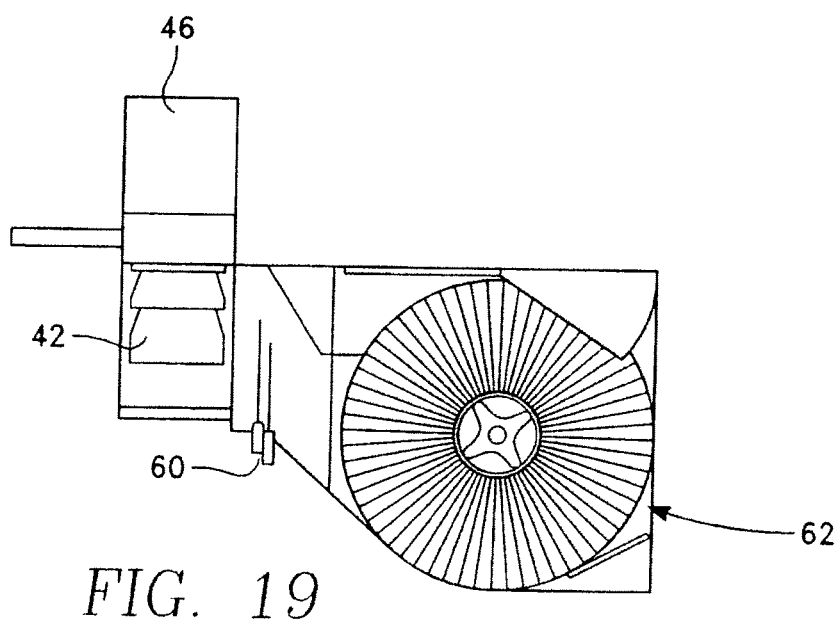
FIG. 19 shows a partial side view of the fan-brush combination shown in FIG. 18.
Figure 20:
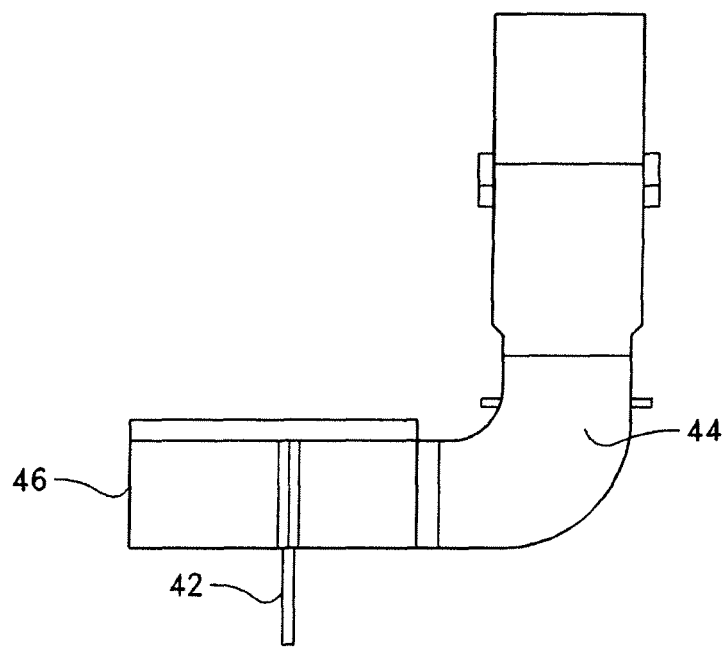
FIG. 20 shows a partial top view of the exterior of the housing for the fan-brush combination shown in FIG. 18.
Figure 21:
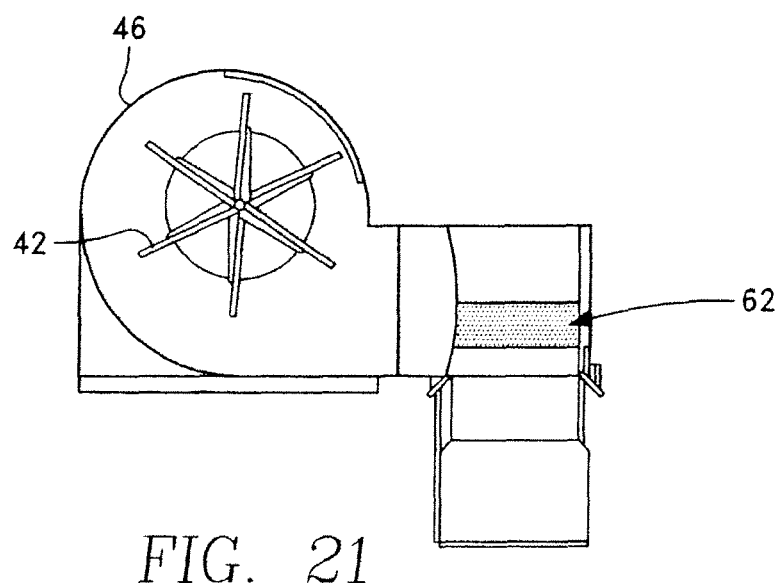
FIG. 21 shows a partial front view of the fan-brush combination shown in FIG. 18, showing an option for placement for liquid spray tips.
Figure 22:
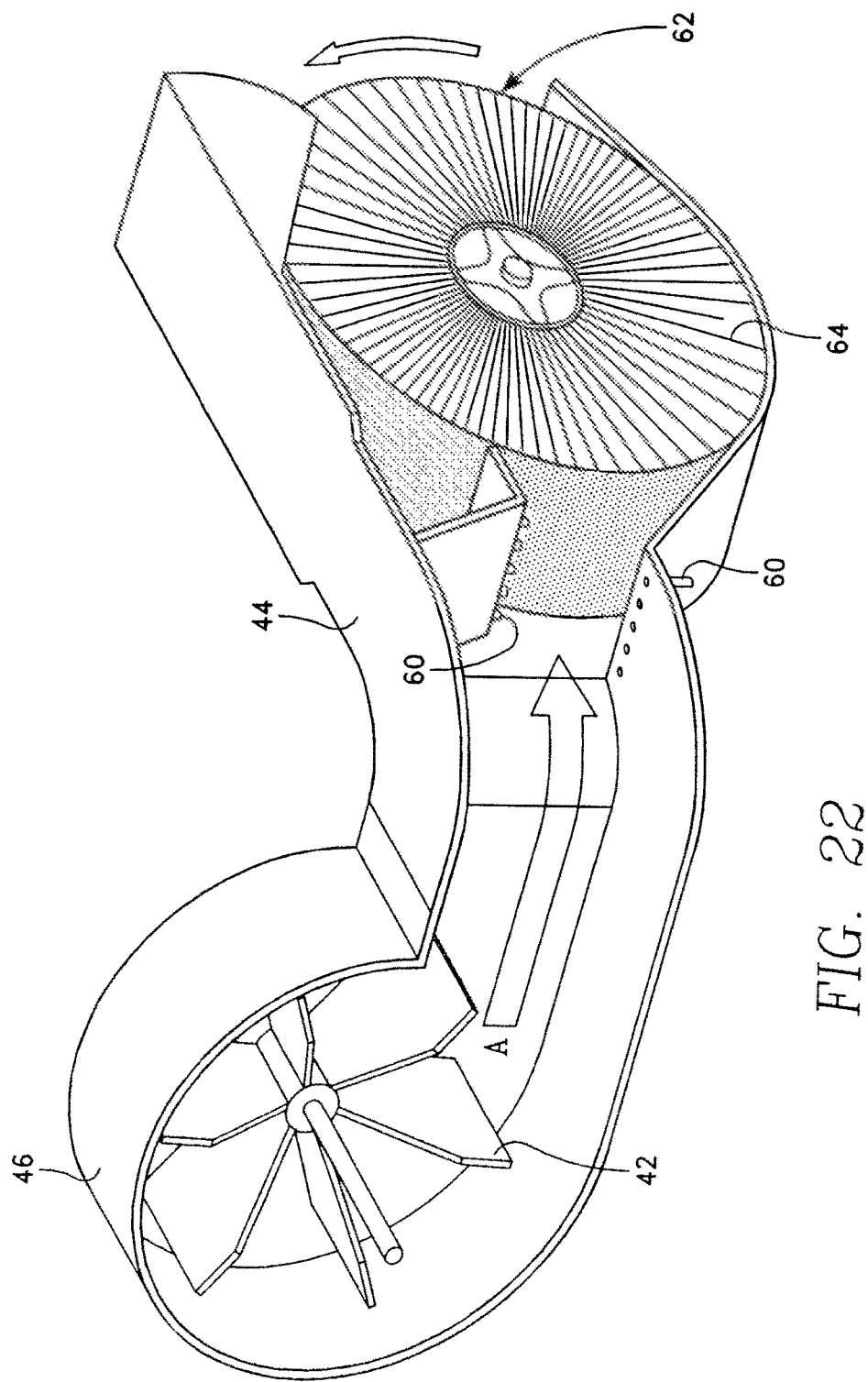
FIG. 22 shows a partial isometric view of a fan brush combination which may be utilized in an embodiment of the disclosed harvester.
Figure 23:
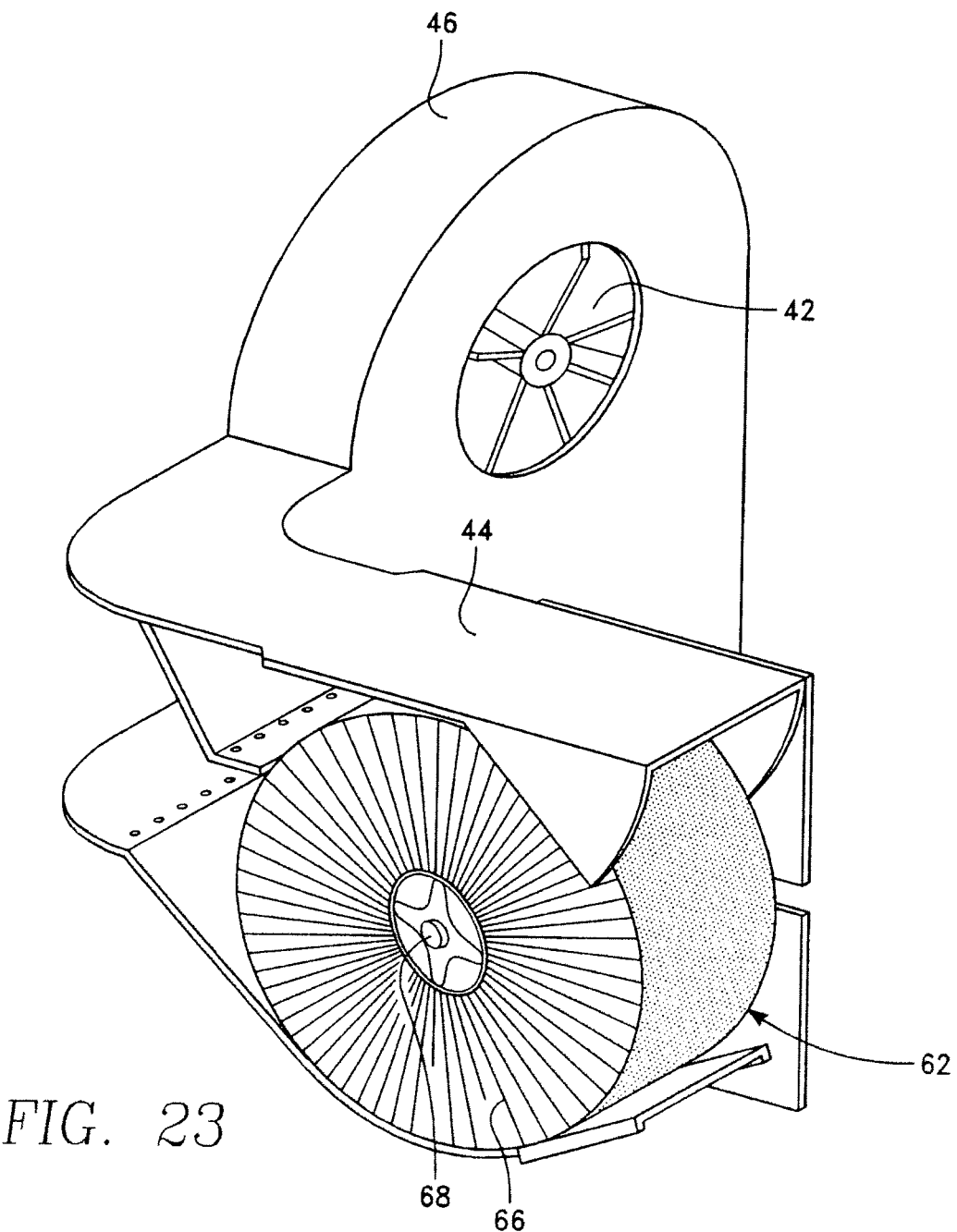
FIG. 23 shows another view of a fan brush combination which may be utilized in an embodiment of the disclosed harvester.
Figure 24:
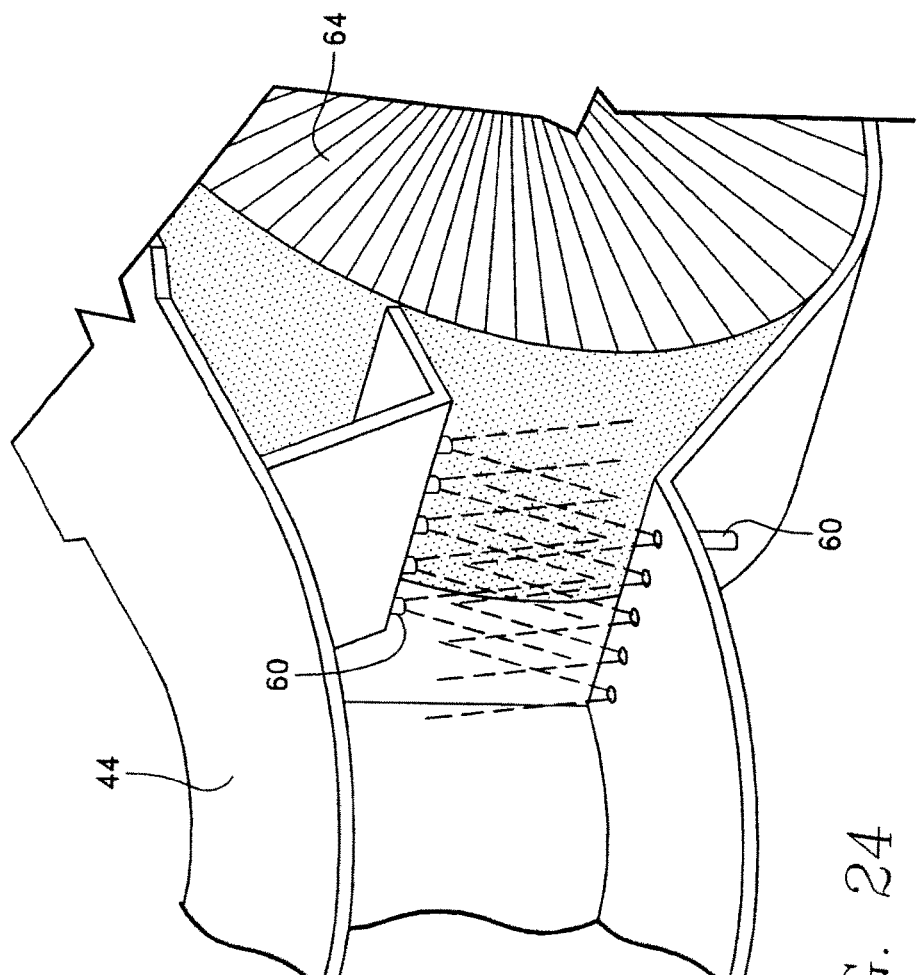
FIG. 24 shows a view of a liquid introduction means which might be utilized in an embodiment of the disclosed harvester.
Figure 25:
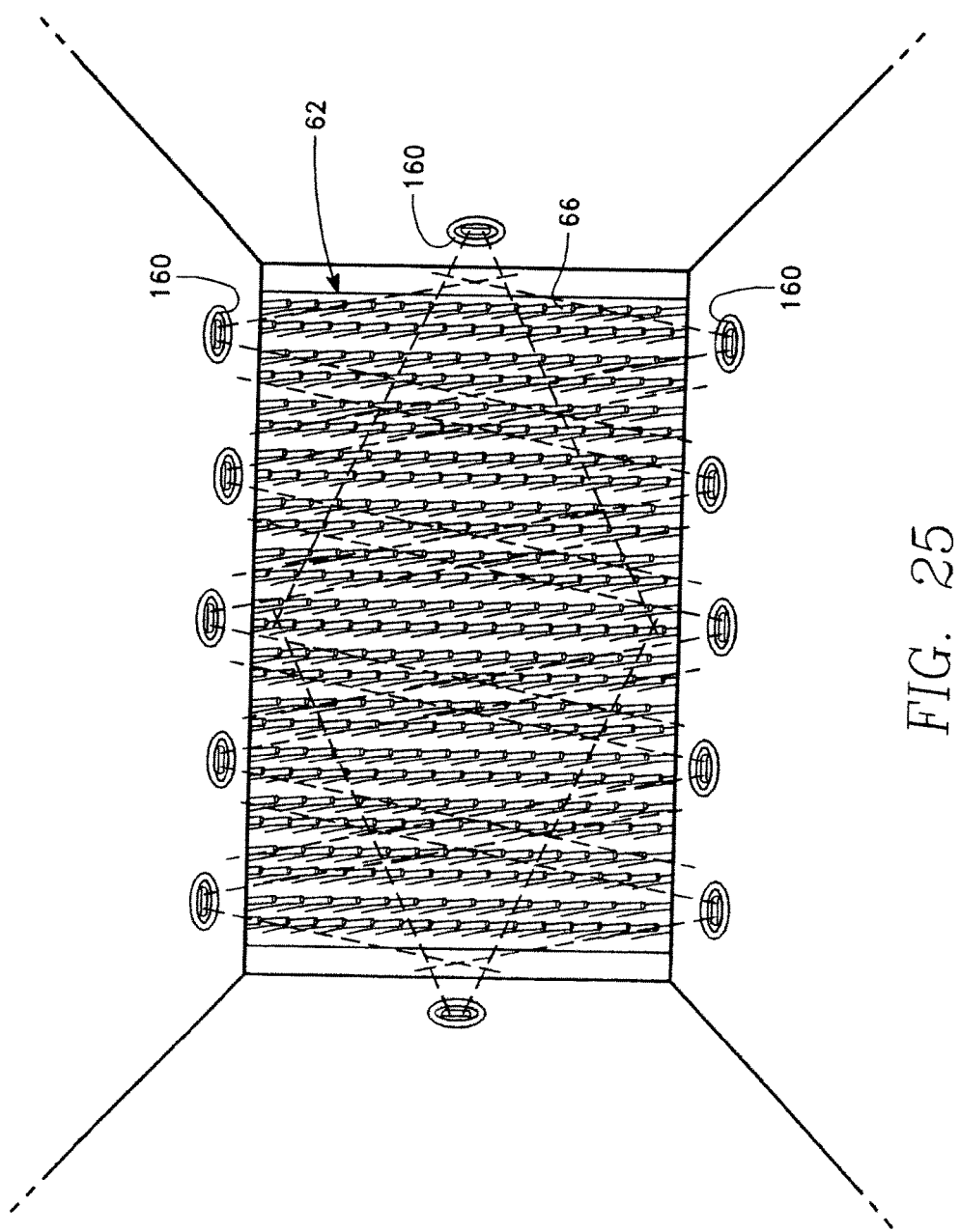
FIG. 25 shows a close up view of another liquid introduction means which might be utilized in an embodiment of the disclosed harvester.

The present invention provides a device for removing dust and other particulate matter, including larger particulate matter, from an air stream. The Figures provided herewith illustrate one embodiment of the present invention adapted for use with a specific device, namely, a crop harvester. It is to be understood, however, that the present device is not limited to use in a crop harvester, or to the layout or design shown in the Figures, which are exemplary and provided for purposes of clarity. The Figures do, however, show key components of the present invention, including a housing 34 having an opening, or air stream inlet, at a first end 32 and an air stream exhaust 70 at a second end, a fan 42, spray tips 60, and scrubber 62. These components of the present device and system are described in greater details with respect to the harvester embodiment, below. The layout, arrangement, and configuration of the components of the present device and system shown in the Figures is exemplary, and it is contemplated that the various components of the present invention may be provided in any suitable configuration or arrangement.

Generally, an air stream enters housing 34 through first end 32 and passes through the device, at least a portion of the particulate matter in the air stream being removed in the process. The air stream may be pulled or pushed through the housing by one or more fans 42, or may enter the housing in some other manner. As the air stream moves through housing 34 is passes through a layer or mist of moisture introduced into the housing 34 by spray tips 60. This moisture causes the particles traveling through the air stream to become wet. The wet particles then impact scrubber 62, adhering thereto.

Scrubber 62 may be any suitable structure for capturing the moistened fine particles traveling through an air stream. Scrubber 62 is preferably a rotating drum with a plurality of brushes extending therefrom, the brushes being disposed to capture the fine particles traveling with the air stream. It is contemplated, however, that other surfaces, including a flat-surfaced rotating drum, may be used. Regardless of the specific structure of scrubber 62, it is preferred that scrubber 62 rotate in the direction of the air stream traveling through housing 34. Further, it is preferred that scrubber 62 rotate slow enough that the fine particles adhered thereto are not cast off by centrifugal forces produced by scrubber 62, but instead fall from scrubber 62 at or near a low point thereof by force of gravity on the mass of the accumulated material. This provides an advantage over existing systems where centrifugal forces cast off material in a relatively uniform distribution. The present system allows material to fall from scrubber 62 in a defined area, reducing problems associated with the accumulation of particulate matter on many of the interior surfaces of housing 34. After passing through scrubber 62, the air stream exits the present device via air stream exhaust 70.

In some embodiments of the present system, larger particulate matter may be traveling with an air stream, and in such embodiments it may be necessary or desirable to remove the large particulates prior to the air stream reaching scrubber 62. In such embodiments, and air stream cleaning chain 50 may be utilized. Air stream cleaning chain 50 is described in greater detail below with respect to the Example.

For purposes of illustration and clarity, an embodiment of the present system is now described in conjunction with a mobile harvester device adapted for use therewith.

Example—Harvester

Now with reference to the figures, FIG. 1 shows an embodiment of a harvesting unit 10 which may comprise an embodiment of a dust suppression system disclosed herein. This type of harvesting unit 10 is mobile, having ground conveyance means such as wheels 12, but it might also comprise tracks, rollers, and the like. Further, the present system may be provided in a stationary device use in harvesting or separating agricultural products from dirt, rocks, and other debris. Harvesting unit 10 gathers harvested crops, such as nuts, fruits and the like, from the ground surface, where the crops will typically have been deposited from the shaking of trees or other harvesting method. The crops are typically deposited in a spread out configuration, forming a carpet on the ground surface. This type of harvesting unit 10 is well suited for the processing of almonds, but could also be utilized in the gathering of a variety of other crops lying on a ground surface after having been removed from a tree. In addition to almonds, the harvested crop may be another variety of nut, such as cashews, chestnuts, hazelnuts, macadamia nuts, pecans, walnuts and tung nuts. Certain fruits, such as figs and oranges, and any fruit, nut or vegetable, as conventionally known to require collection and processing from the ground, may also be gathered with this type of harvester, and this embodiment of the present dust suppression system employed. It is to be appreciated that while the Figures herein show a harvester 10 which is equipped to be towed by a tractor or other towing vehicle, the present dust suppression system may equally be utilized with a self-propelled harvesting unit. The various conveyors, chains, drive wheels, and the like of the harvester will be driven by the means known in the art, typically by hydraulic motors.

The type of harvesting unit 10 described for purposes of this example generally comprises a collection means for collecting the agricultural products, such as crops 14, from the ground surface S. Because the crops 14 are blanketed across the ground dispersed among other foreign matter 16, such as leaves, twigs, dirt, gravel, dirt clods, and the like, the collection means will gather a combination of all of these materials into the harvesting unit. The foreign matter 16 will typically comprise a mixture of larger and smaller particles, and some foreign matter will comprise dirt or other relatively fine grained particles. The collection means may comprise brushes, conveyors, or a sweeping array as disclosed in U.S. Pat. Nos. 7,131,254 and 7,412,817 which were invented by some of the inventors herein and which are incorporated herein in their entireties by this reference. One embodiment of the collection means may comprise a rotating sweeper 18 and/or pickup belt 20 which gather the agricultural products and foreign matter from the ground S. The collection means directs all of the gathered materials onto a primary chain 22. The primary chain 22 has a receiving end 24 which receives the crops and foreign matter which have been collected by the collection means. At the end opposite the receiving end 24, the primary chain comprises a delivery end 26 to which substantially all of the crops and foreign matter are delivered. However, it is to be appreciated that the primary chain 22, and the other chains of most harvesters, are typically linked chain with openings, such that smaller foreign matter and perhaps smaller crops will fall through back onto the ground surface S. Therefore, while a substantial amount of the crops and foreign matter will reach the receiving end 24, some of the crops and foreign matter may have fallen through the openings in the primary chain 22.

The harvesting unit 10 further comprises an elevator chain 28. The elevator chain 28 receives crops and foreign matter from primary chain 22. The crops are carried up elevator chain 28 and discharged through discharge chute 30 to a storage container, the ground, or other repository for the crops. Adjacent to elevator chain 28 is the end 32 of a ductwork or housing 34 which may be oriented along the lengthwise axis of the harvesting unit 10. An opening is defined at the end 32 of the housing by the top 36, side pieces 38, and bottom 40. A fan 42 is disposed within housing 34 within its own fan housing 46. Fan 42 generates an air stream A by pulling air from the opening at the end 32 of the housing 34 and discharging the air into discharge duct 44 on the opposite site of the fan 42. The air stream A flows through housing 34, with the direction of the air stream generally moving from the elevator chain 28 toward the fan 42. The fan 42 may thus be considered to have a suction side which is oriented toward end 32 and at least a portion of elevator chain 28 and a discharge side which begins on the opposite side of the fan, with the generated air stream discharging into air stream discharge duct 44. As suction is pulled by the air stream A through the openings in elevator chain 28, and through the crops and foreign matter being transported on the elevator chain, the lighter foreign matter is carried in the air stream toward fan 42 through housing 34.

Disposed between fan 42 and elevator chain 28 is an air stream cleaning chain assembly 48. The air stream cleaning chain assembly 48 comprises the primary separation methodology for removing foreign material from the air stream before much of the foreign material is passed through the fan 42 and discharged into the atmosphere. The air stream cleaning chain assembly 48 may comprise air stream cleaning chain 50, drive roller 52 and idler rollers 54. As air stream cleaning chain 50 is rotated about the idler rollers 54, a portion of the air stream cleaning chain is continually positioned to be normal to the general direction of the air stream A. Air stream cleaning chain 50 allows the air stream to pass through it, but stops the larger particles of foreign material, such as leaves, grass, etc., because the air stream cleaning chain comprises a plurality of closely spaced links, wherein the openings between the links are relatively small. Air stream cleaning chain 50 may have a width of approximately four feet.

Foreign material which is stopped by the air stream cleaning chain 50 is discharged from the harvesting unit 10 by discharging means which transport the larger particles of the foreign matter collected on the air stream cleaning chain to the exterior of the harvesting unit. The discharging means may comprise a cross conveyor discharge belt 56 which is disposed below the air stream cleaning chain 50. Foreign material accumulated on the air stream cleaning chain is deposited onto the cross conveyor discharge belt 56, which transports the larger particles of the foreign material to a disposal duct through an air lock assembly 58.

The finer particles of foreign material will be carried through the openings in air stream cleaning chain 50 and transported through housing 34 by air stream A through fan 42 and into air stream discharge duct 44, which is on the discharge side of the fan. The air stream discharge duct 44 comprises a further mechanism for removing particulates from the air exhaust of the harvester 10, which is utilized to remove smaller particles which passed through the air stream cleaning chain 50. This mechanism employs injecting water or other appropriate liquid into the air stream A as it enters the air stream discharge duct 44. As shown in FIGS. 18 through 25, the air stream discharge duct 44 comprises liquid introduction means such as a plurality of spray tips 60, or other liquid introduction means, such as directional jets 160 shown on 25. Directional jets 160 may be set within the inside wall of air stream discharge duct 44 and may be installed and directed to provide a curtain of liquid spray through which the air stream A, with its entrained dust particles, passes. Other liquid introduction means may be utilized. For example, spray tips comprising a variety in number and tip size may be used for this purpose. As another embodiment, the system may utilize multiple manifolds of spray tips to offer various options for the introduction of the liquid into the dust infused air stream. The harvester 10 may comprise liquid storage tanks for storing the liquid utilized for the liquid sprayed into the air stream discharge duct 44, and the related pumps and conduits required for the liquid injection process. Alternatively, the storage tanks and pumps may be carried on a separate apparatus.

The air stream discharge duct 44 may comprise additional means for suppressing the fine dust particles transported in the air stream A. The air stream discharge duct may further comprise a scrubber 62. Scrubber 62 may comprise a rotating wafer brush drum 64. The wafer brush drum consists of multiple wafer brushes 66 mounted on a brush attachment sleeve 68, or other collection members which radially extend from the brush attachment sleeve. The wafer brush drum 64 may be rotated in a concurrent direction with the flow of air stream A so as not to cause undue back pressure on the air system. Because of the liquid introduction means discussed above, the air stream A reaching the wafer brush drum is moistened. As the moistened air stream A flows through the wafer brushes, small pieces of moist dirt are scrubbed from the air stream, accumulating on the collection members such that the air being discharged through air exhaust 70 has been substantially cleaned of particulate matter.

Air stream discharge duct 44 connects to fan housing 46 at flange 72. Portions of air stream discharge duct 44 may be easily removable to gain access to the various components of the scrubber 62 and the liquid introduction means contained therein. For example, flange 72 may be held together with a quick-release mechanism 74 and air stream discharge duct 44 may be hinge connected at the flange to allow the air stream discharge duct to pivot outwardly so there is easy access to the internal components.

As noted above, the various components of the present system may be provided in any suitable arrangement or configuration, as necessary or desired given the specific use of the system under a variety of circumstances. Fan 42, for example, may be present near the air stream inlet, in effect pushing the air stream through housing 34, or may be located near the air stream exhaust 70, pulling the air stream through housing 34. In some embodiments of the invention, fan 42 may be located at a point between the inlet and the exhaust, such as between the air stream cleaning chain and the at least one spray tip. In some embodiments of the present system, multiple fans 42 may be provided along the length of housing 34 as necessary to adequately move the air stream therethrough.

The present system is not limited by specific dimensions of housing 34, the air stream inlet or air stream exhaust 70, or scrubber 62. As noted above, any suitable scrubber 62 may be used that accumulates moistened particles thereon and then allows the accumulated matter to drop off of the scrubber by force of gravity on the mass of accumulated matter. Further, the relative dimensions of the scrubber in relation to the housing are not limited by what is described herein or shown in the drawings. The scrubber 62 should, however, be sized and shaped such that most of the air stream traveling through housing 34 impacts scrubber 62, thereby allowing fine particles traveling therewith to be accumulated on scrubber 62. It is contemplated that many modifications to the present device and system will be readily apparent to those of skill in the art upon reading this disclosure.

The discussion below pertains to general principles of the present invention, as well as various additional embodiments thereof. In the discussion below, it should be noted that the terms 'aggregation' or 'aggregate' refers to an accumulation of parties in an air stream, the particles adhering to one another, or a surface of the present device as one particle adheres to the surface of the device and additional particles adhere to the first. Thus, the terms 'aggregation' or 'aggregate' refer broadly to an accumulation of particles from the air stream, whether occurring in air or on a surface.

Also, as used herein, the term 'aggregator' refers to any mechanism for facilitating the aggregation of particles in the air stream. The aggregator may, for example, be a rotating wheel, drum, chain accumulator, membrane, or the like, a cyclone separator, or merely an area at which the air stream is agitated or 'mixed,' such as when physical agitation of the air itself facilitates the aggregation of particles in the air stream.

Figure 26:
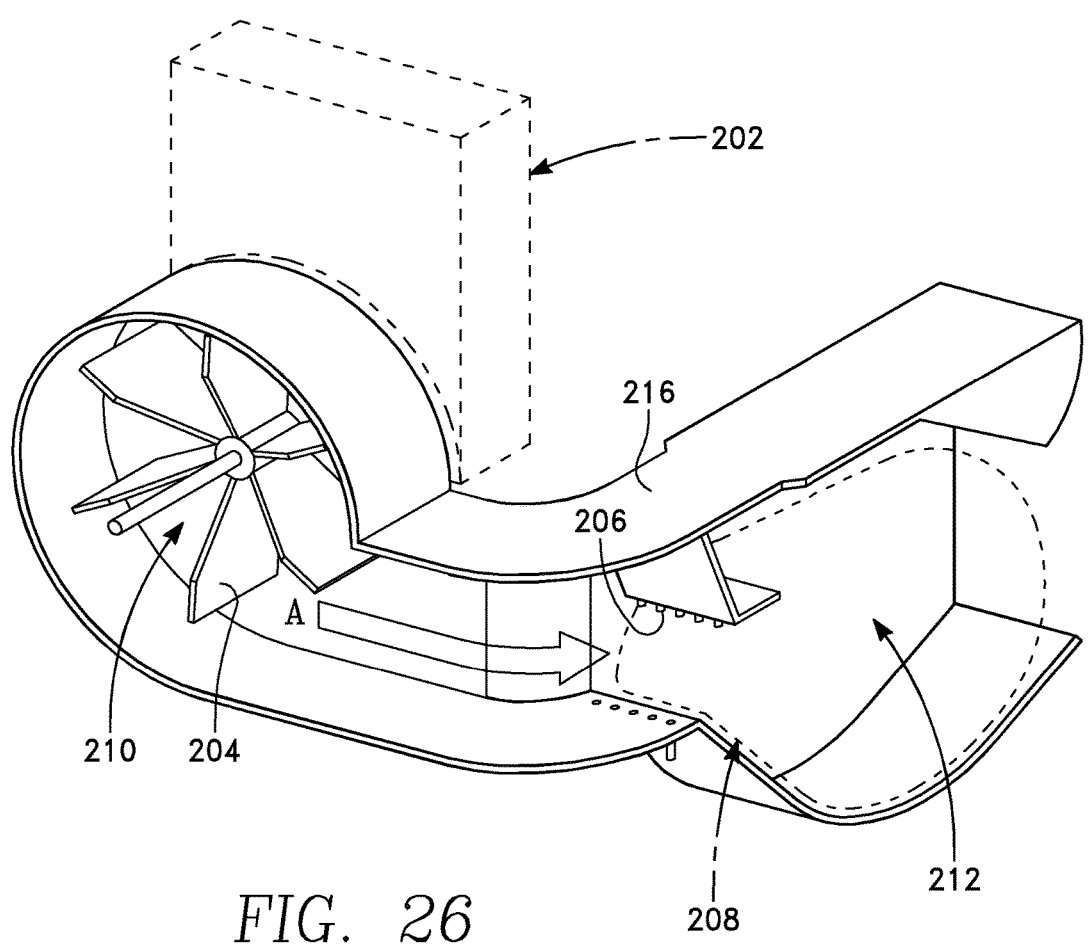
FIG. 26 shows an embodiment of a dust suppression system of the present invention, with the position of a scrubber shown in dashed lines.

The underlying principles of the present invention provide a system for particulate removal from an air stream generated by an agricultural device. While specific embodiments are described, above, a variety of modifications and alternative embodiments may be provided without departing from the general principles of the invention. As shown in FIG. 26, system 200 is associated with a device 202 (which could be any agricultural device) that produces dust and other particulate matter during operation. For example, device 202 may be any agricultural device, mobile or stationary, used to harvest product or otherwise interact with the soil or with plants growing in the soil. Dust, dirt, and other debris generated by device 202 may be directed into housing 216 of the present invention. Ways in which to ensure that air streams conveying dust and other debris generated by device 202 are directed into housing 216 are well known in the art.

An air stream carrying dust and other debris generated by device 202 enters housing 216 at inlet 210. This air stream may be pulled into housing 216 by optional fan 204, or it may be directed into housing 216 by some device or structure within device 202. In some embodiments of the invention, a combination of these may be used. As noted above, methods and devices for directing an air steam along a given path are well-known in the art, and it is contemplated that any suitable device or method for accomplishing this may be used in conjunction with the present invention.

As the air stream travels through housing 206, it passes in the vicinity of at least one liquid introduction jet 206, whereupon the air stream passes through a fine mist of liquid, as described above, causing the particulate matter within the air stream to become wet. The wet particulate matter can be removed from the air stream by any of a variety of mechanisms that include use of a scrubber 208. A dashed line 208 is used in FIG. 26 to show a general location of a scrubber 208 in system 200. Specific, exemplary embodiments of scrubber 208 suitable for use with the present invention are detailed below.

Figure 27:
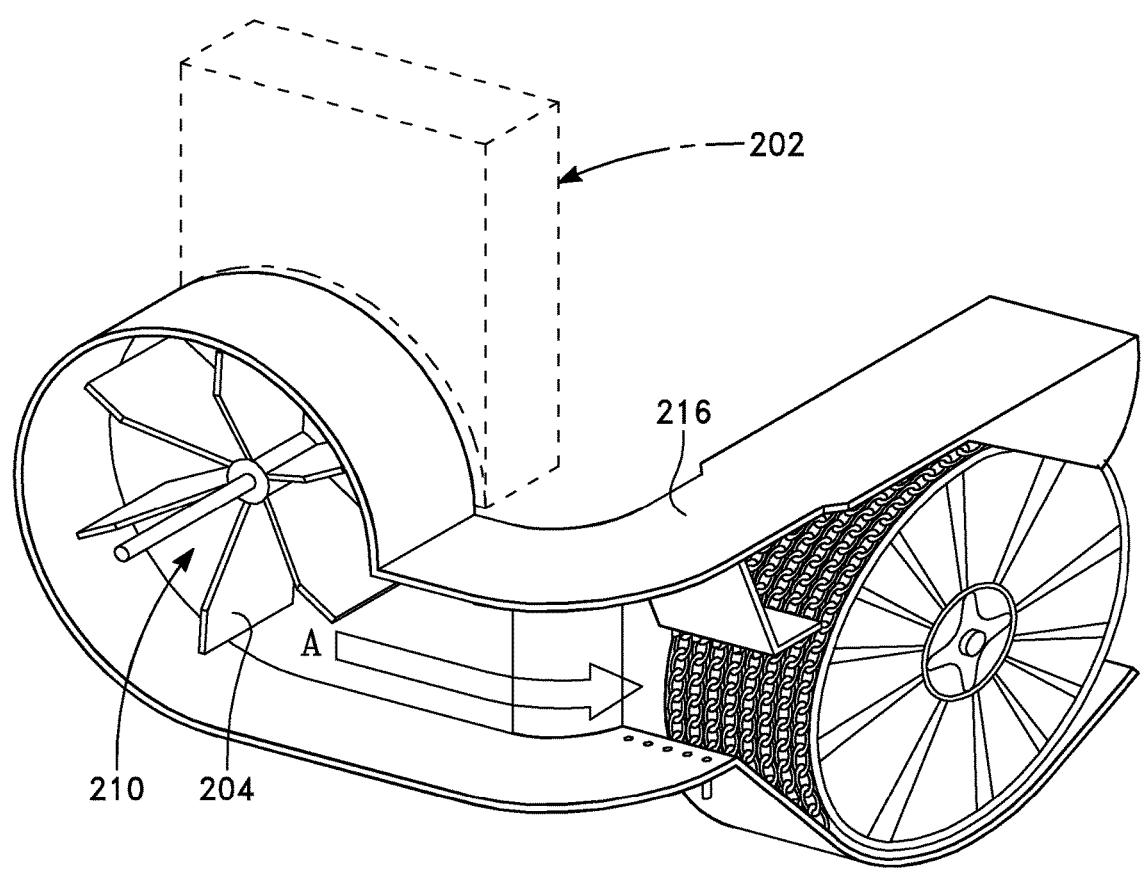
FIG. 27 shows one embodiment of a scrubber suitable for use with the present invention.

FIG. 27 shows one embodiment of a scrubber 208 suitable for use with the present invention. The embodiment of scrubber 208 shown is a rotating chain accumulator 218 on which moistened or wet particles in the air stream accumulate. The accumulated particles fall from chain accumulator 218 by force of gravity. Chain accumulator 218 may be constructed of any suitable material. Exemplary materials include stainless steel, carbon fiber, and various synthetic polymers having the requisite strength and physical properties to provide the functionality required of chain accumulator 218. It is preferred that the surface area presented to the air stream by chain accumulator 218 is substantial. As such, the size of the openings between various "links" or connections in chain accumulator 218 is preferably small. It is contemplated that the air stream containing moistened particulate matter can flow through chain accumulator 218, with the moistened particles impacting chain accumulator 218 and adhering thereto, while the cleaned air passes through the chain and exits housing 216 via outlet 212. As portions of chain accumulator 218 reach the bottom of the rotation circuit of the chain accumulator, the particles that have accumulated on chain accumulator 218 tend to fall from chain accumulator 218 due to the force of gravity. The particulate matter may fall onto an interior surface of housing 216, for later cleaning and removal, or housing 216 may have a grating, screen, or other opening at or near the bottom of the rotation circuit of chain accumulator 218. The grating, screen, or other opening preferably opens to the outside of housing 216, such that the particulate matter falling from chain accumulator 218 exits housing 216 and falls directly to the ground. An exemplary chain accumulator 218 is shown in FIG. 27.

In addition to the embodiments of the invention having a chain accumulator 218, described above, it is contemplated that in some embodiments of the invention, portions of the bottom of housing 216 may be open such that a portion of chain accumulator 218 actually protrudes from, or travels outside of, housing 216 during rotation. In such embodiments of the invention, particulate matter falling from chain accumulator 218 simply falls directly to the ground. It should also be noted that the principles described above with respect to chain accumulator 218 may also be applied to a rotating screen, mesh, fabric, or any material allowing airflow therethrough while retaining the moistened particulate matter in the air stream. The size and spacing of the openings in the accumulator, regardless of composition, may be adjusted to reflect a desired rate of air flow-through, as well as the desired degree of particle accumulation and retention.

Figure 28:
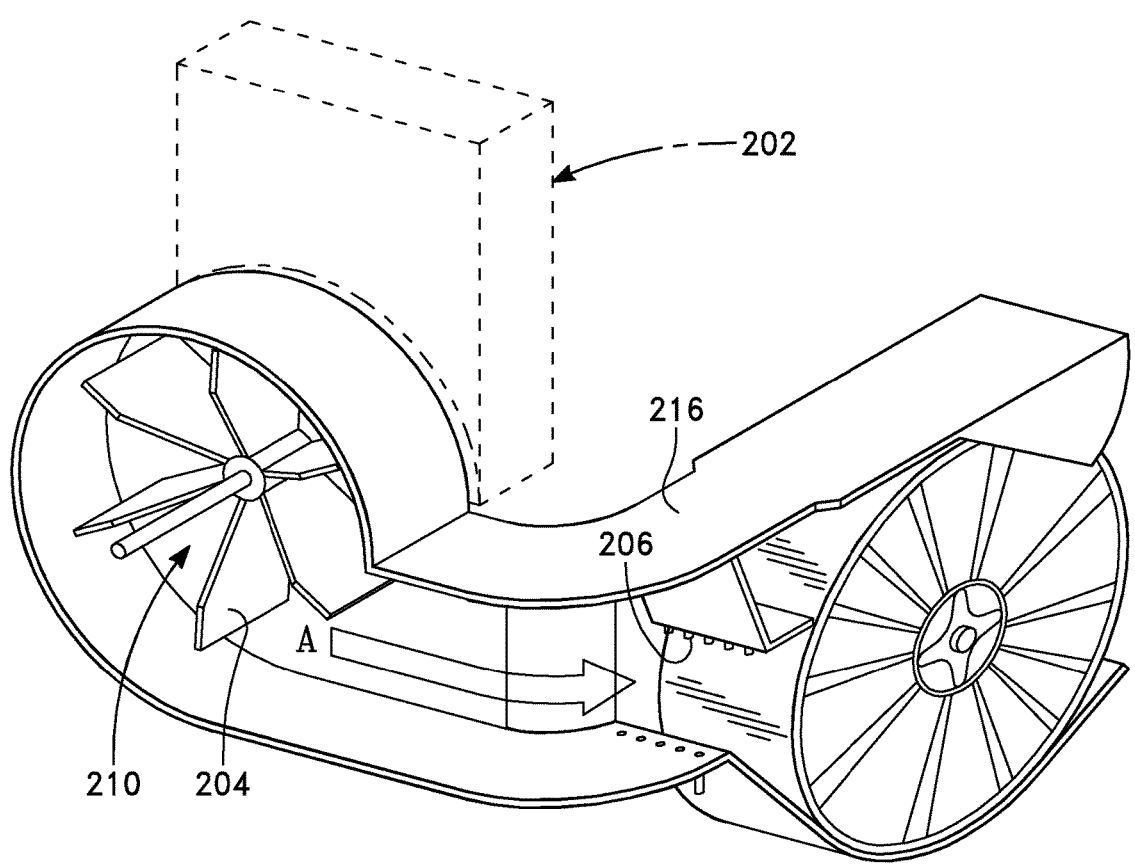
FIG. 28 shows one alternative embodiment of a scrubber suitable for use with the present invention.

FIG. 28 shows an embodiment of the present invention wherein scrubber 208 is a rotating drum 220 disposed within the air stream flowing through housing 216. Some embodiments of the invention employing a rotating drum 220 may include liquid introduction jets 206, as described above. In such embodiments, the air stream passes in the vicinity of liquid introduction jets 206 prior to contacting rotating drum 220. The particulate matter within the air stream is moistened and adheres to rotating drum 220 upon contacting it. As with other embodiments of the invention, described above, as particulate matter accumulates from rotating drum 220, the particulate matter falls from rotating drum 220 at or near the bottom of the rotation due to the force of gravity.

Other embodiments of the invention may include a rotating drum 220, but instead of liquid introduction jets 206, a cleaning spray nozzle 222 may be provided near the bottom of the rotation of rotating drum 220. The cleaning spray nozzle 222 may clean particulate matter from rotating drum 220 while at the same time ensuring the surface thereof remains wet, so that particulate matter contained within a dry air stream will adhere to rotating drum 220 when coming into contact with the same. Some embodiments may have both liquid introduction jets 206 and cleaning spray nozzle 222.

Rotating drum 220 may be constructed of any suitable materials. Preferred materials include, for example, membranous materials or other materials that become sticky or tacky when contacted with water. Such materials cause particulate matter in the air stream to preferentially adhere to rotating drum 220. The particulate matter that accumulates on rotating drum 220 may fall off due to the force of gravity, may be washed off by cleaning spray nozzle 222, or a combination of the two.

Other embodiments of the present invention may employ other methods of separating particulate matter from the air stream, allowing clean air to pass out of outlet 212. For example, in some embodiments of the invention, air flow within housing 216 may be directed therethrough such that a cyclonic action is created within a portion of housing 216. Such embodiments of the present invention do not include a scrubber, per se; the cyclonic action of the airflow acts as the aggregator. As the air stream is caught up in the cyclonic action, heavier particles are pushed to the outside, impacting and adhering to the walls of housing 216. In such embodiments of the invention, it is contemplated that liquid introduction jets 206 are provided just prior to the air stream entering the area of cyclonic action. This wetting of the particles produces slightly heavier particles, increasing the efficiency of separation, and also helps the particles adhere to the interior surface of housing 216. It is contemplated that particles accumulating within housing 216 will fall to the ground by force of gravity once sufficient weight has accumulated.

Such a cyclone separator typically utilizes a cylindrical or conical enclosure, and it is contemplated that a portion of housing 216 may be sized and shaped so as to perform cyclonic separation. Air flows through this portion of housing 216 in a helical pattern. Larger or more dense particles, or aggregations of particles, have inertia that is too great to allow them to follow the tight curve of the airflow. Instead, these particles or aggregations impact the walls of housing 216 and fall to the ground. It should be noted that in embodiments of the invention employing cyclonic separation, the portion of the housing 216 in which the cyclonic flow takes place, as well as the walls of that portion of the housing, which receive the larger or more dense particles, are referred to collectively herein as a cyclone separator. The cyclone action may be created by the air stream having the particles therein, or by separate air streams introduced into the housing.

In any of the foregoing embodiments, the underlying principle of the invention remains consistent. An air stream containing particulate matter is directed through a housing, the particulate matter is contacted with water to facilitate the separation of the particulate matter from the air stream, and mechanical separation is utilized to actually separate the particles from the air stream. The force of gravity pulls accumulated particulate matter to the ground. Scrubber 208 may be any suitable mechanism for removing the particulates from the air stream, and the particulates may be wet prior to contacting scrubber 28, or a portion of scrubber 28 may be wet when the particles impact it, or both.

Still other embodiments of the invention may rely on the mixing of the air stream once it has passed the liquid introduction jets, in addition to a physical scrubber for separation. Alternatively, in some embodiments of the invention, mixing alone may be sufficient.

Figure 29:
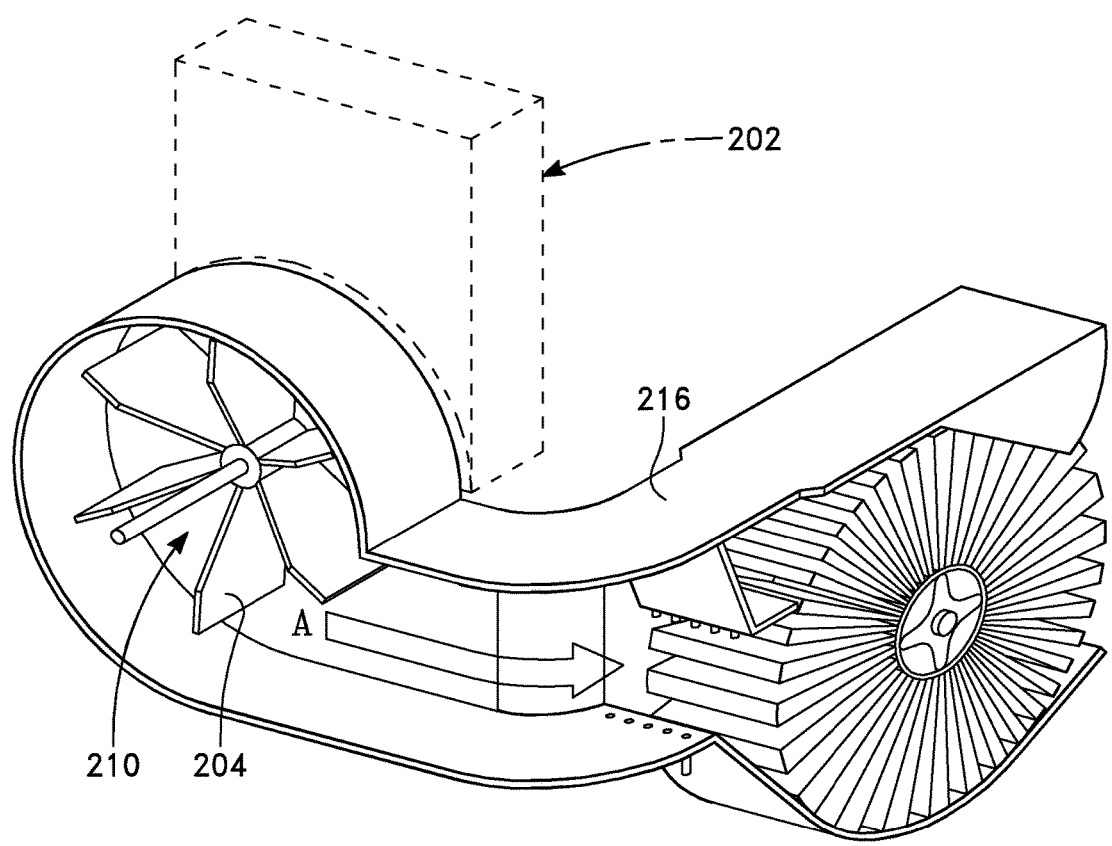
FIG. 29 shows one embodiment of the present system utilizing a paddle wheel as a mixer and/or scrubber.

As shown in FIG. 29, for example, a draper wheel or paddle wheel 224 may be utilized to mix the air stream flowing through housing 216. As the air stream mixes, moistened particulate matter tends to aggregate and drop from the air stream by force of gravity. Paddle wheel 224 also provides a physical surface for accumulation of moistened particulates from the air stream. These particulates may accumulate until the weight of accumulated material is sufficient to cause them to fall from paddle wheel 224.

A device similar to chain accumulator 218 may also be used to mix the air steam as it travels through housing 216 and past liquid introduction jets 206. In a mixing embodiment, the openings in chain accumulator 218 may be much larger, with less surface area for particle accumulation because agitation and mixture of the air stream is the goal. It is nevertheless contemplated that some of the moistened particulate matter will accumulate on the chain accumulator and drop off due to gravity once the weight thereof reaches the necessary threshold.

Mixing may also be accomplished simply by introducing one or more additional, agitating air steams into housing 216 after the air stream from device 202 passes in the vicinity of liquid introduction jets 206. These air streams can mix the moistened particulates in the air steam from device 202, causing them to aggregate and fall from the air stream under the force of gravity. The aggregator of such embodiments may be called an air stream mixer. Further, it is contemplated that the interior surfaces of housing 216 may be physically shaped and formed in such as a way as to facilitate mixing of the air stream.

Figure 30:
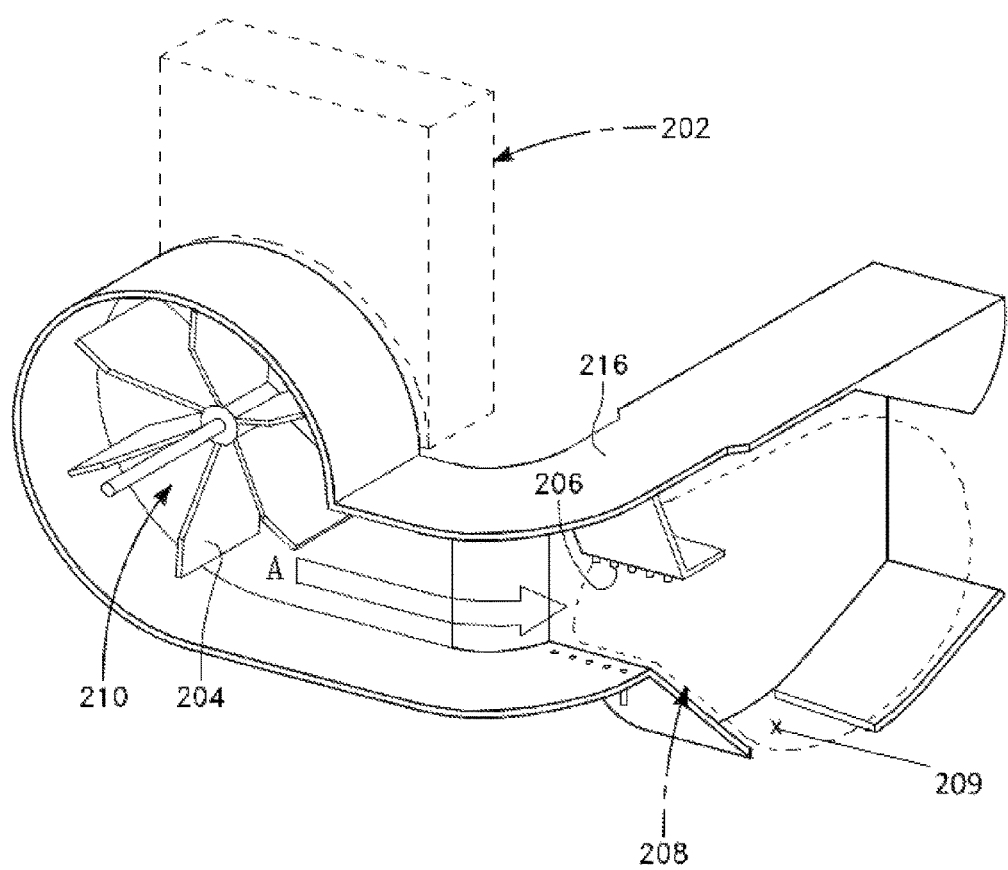
FIG. 30 shows one embodiment of the present system having an opening disposed beneath the aggregator of the system.

FIG. 30 depicts an embodiment of device 200 having an opening 209 disposed beneath an aggregator of the device. In the embodiment shown in the figure, the aggregator is a scrubber 208, and may be any suitable type of scrubber. Particles aggregated from an air stream passing through housing 216 may fall through opening 209 when falling from scrubber 208 by force of gravity.

Having thus described the preferred embodiment of the invention, what is claimed as new and desired to be protected by Letters Patent includes the following:

1. A system for removing particles from an air stream, the system comprising:

a housing defining an air stream inlet at a first end thereof, an air stream outlet at a second end thereof, and a flow path between the air stream inlet of the housing and the air stream outlet of the housing, wherein the air stream inlet is configured to receive an air stream from an agricultural device; and a rotating aggregator disposed between the air stream inlet of the housing and the air stream outlet of the housing, wherein the rotating aggregator is configured to rotate about an axis perpendicular to the flow path defined by said housing, further wherein the aggregator is configured to facilitate aggregation of particles in an air stream passing through the housing and remove them therefrom, and further wherein aggregated particles within the air stream fall from the aggregator by force of gravity.

2. The system according to claim 1, wherein the aggregator is a scrubber.

3. The system according to claim 1, further comprising a cleaning spray nozzle disposed within said housing, said cleaning spray nozzle configured to introduce liquid onto a surface of said aggregator.

4. The system according to claim 1, further comprising a liquid introduction jet disposed within said housing between said air stream inlet and said aggregator, said liquid introduction jet configured to introduce liquid droplets into an air stream passing through said housing.

5. The system according to claim 1, wherein the aggregator is configured to rotate at a speed insufficient to cause aggregated particles to be cast from said aggregator via centrifugal force.

6. The system according to claim 1, wherein said housing defines an opening beneath said aggregator, positioned such that particles falling from said aggregator by force of gravity pass through said opening.

* * * * *